United States Patent
Engineer

(10) Patent No.: US 10,277,953 B2
(45) Date of Patent: Apr. 30, 2019

(54) SEARCH FOR CONTENT DATA IN CONTENT

(71) Applicant: The DIRECTV Group, Inc., El Segundo, CA (US)

(72) Inventor: Hiten Engineer, Torrance, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 15/371,183

(22) Filed: Dec. 6, 2016

(65) Prior Publication Data
US 2018/0160189 A1 Jun. 7, 2018

(51) Int. Cl.
*H04N 5/445* (2011.01)
*H04N 21/482* (2011.01)
(Continued)

(52) U.S. Cl.
CPC ..... *H04N 21/4828* (2013.01); *G06F 17/3005* (2013.01); *G06F 17/30026* (2013.01); *G06F 17/30837* (2013.01); *G06F 17/30846* (2013.01); *H04N 21/278* (2013.01); *H04N 21/4394* (2013.01); *H04N 21/47217* (2013.01);
(Continued)

(58) Field of Classification Search
CPC ............... H04N 21/233; H04N 21/439; H04N 21/4394; H04N 21/472; H04N 21/4828
See application file for complete search history.

(56) References Cited

U.S. PATENT DOCUMENTS 6,396,544 B1     5/2002  Schindler et al.
6,961,954 B1 *  11/2005  Maybury .......... G06F 17/30787
                                              707/999.003
(Continued)

FOREIGN PATENT DOCUMENTS

EP          1917586 A2      5/2008
KR         20110080712      7/2011
WO         2009123594 A1   10/2009

OTHER PUBLICATIONS

US 8,914,402 B2, 12/2014, Phillips et al. (withdrawn)
(Continued)

*Primary Examiner* — Pankaj Kumar
*Assistant Examiner* — Timothy R Newlin
(74) *Attorney, Agent, or Firm* — Amin, Turocy & Watson, LLP

(57) ABSTRACT

Video and audio content is searchable using a text search. A search component can analyze respective items of content to identify words spoken in the items of content, and generate respective transcripts of the respective words of the items of content based on the analysis. The search component receives a text search comprising a keyword and analyzes the respective transcripts to determine whether a transcript(s) contains a word that matches or substantially matches the keyword. The search component generates a search result(s) associated with the transcript(s) that at least is a substantial match to the keyword. The search component can present a time indicator indicating a time position in proximity to where the word is located in the content of the search result(s), and presentation of the content can start from that time position. The search component can be executed in a set-top box associated with a presentation device.

20 Claims, 12 Drawing Sheets

(51) Int. Cl.
  *G06F 17/30* (2006.01)
  *H04N 21/488* (2011.01)
  *H04N 21/278* (2011.01)
  *H04N 21/439* (2011.01)
  *H04N 21/472* (2011.01)
  *H04N 21/81* (2011.01)
  *H04N 21/84* (2011.01)

(52) U.S. Cl.
  CPC ..... *H04N 21/4884* (2013.01); *H04N 21/8133* (2013.01); *H04N 21/4821* (2013.01); *H04N 21/84* (2013.01)

(56) References Cited

U.S. PATENT DOCUMENTS

| | | | |
|---|---|---|---|
| 7,039,585 B2* | 5/2006 | Wilmot | G06F 17/3061 379/88.14 |
| 7,466,334 B1* | 12/2008 | Baba | G11B 27/034 348/14.06 |
| 7,599,844 B2 | 10/2009 | King et al. | |
| 7,707,037 B2 | 4/2010 | Claudatos et al. | |
| 7,725,307 B2 | 5/2010 | Bennett | |
| 7,743,064 B2 | 6/2010 | Faulkner et al. | |
| 8,185,543 B1 | 5/2012 | Choudhry et al. | |
| 8,196,045 B2 | 6/2012 | Chandratillake et al. | |
| 8,311,823 B2* | 11/2012 | Bloebaum | G06F 17/30746 704/231 |
| 8,312,022 B2 | 11/2012 | Wilde et al. | |
| 8,612,384 B2 | 12/2013 | Hall | |
| 8,694,318 B2* | 4/2014 | Yu | G10L 15/26 704/254 |
| 8,713,016 B2* | 4/2014 | Chipman | G06F 17/3053 707/737 |
| 9,372,926 B2 | 6/2016 | Olstad et al. | |
| 9,378,209 B2* | 6/2016 | Chowdhury | G06F 17/30843 |
| 2003/0093814 A1* | 5/2003 | Birmingham | H04N 7/17318 725/136 |
| 2003/0120748 A1* | 6/2003 | Begeja | H04N 7/17318 709/217 |
| 2003/0187632 A1 | 10/2003 | Menich | |
| 2005/0273840 A1* | 12/2005 | Mitts | H04N 7/0885 725/136 |
| 2006/0212897 A1* | 9/2006 | Li | H04H 60/58 725/32 |
| 2006/0282465 A1* | 12/2006 | Sharma | G06F 17/30864 |
| 2007/0041706 A1* | 2/2007 | Gunatilake | G11B 27/10 386/241 |
| 2008/0166106 A1* | 7/2008 | Ozawa | G11B 27/34 386/244 |
| 2010/0088293 A1* | 4/2010 | Daigle | G06F 17/30053 707/705 |
| 2010/0162164 A1* | 6/2010 | Kwon | G06F 17/30864 715/803 |
| 2010/0251291 A1* | 9/2010 | Pino, Jr. | H04N 5/445 725/34 |
| 2013/0018895 A1 | 1/2013 | Harless et al. | |
| 2013/0166303 A1 | 6/2013 | Chang et al. | |
| 2014/0009677 A1* | 1/2014 | Homyack | H04N 5/445 348/468 |
| 2014/0081633 A1 | 3/2014 | Badaskar | |
| 2014/0164371 A1 | 6/2014 | Tesch et al. | |
| 2014/0379731 A1 | 12/2014 | Dixit et al. | |
| 2015/0215665 A1* | 7/2015 | Casagrande | H04N 21/233 725/32 |
| 2015/0293995 A1* | 10/2015 | Chen | G06F 17/30029 707/706 |

OTHER PUBLICATIONS

Van Thong, et al. "Speechbot: an experimental speech-based search engine for multimedia content on the web." IEEE transactions on multimedia 4.1 (2002): 8896. [ftp://gatekeeper.dec.com/pub/DEC/CRL/publications/jmvt/crltr20016.pdf]. Retrieved on Sep. 15, 2016, 22 pages.

Chang et al., "Columbia university trecvid-2005 video search and high-level feature extraction." NIST TRECVID workshop, Gaithersburg, MD. 2005. [http://www.ee.columbia.edu/~winston/papers/cu05tv05notebook.pdf]. Retrieved on Sep. 15, 2016, 8 pages.

Flickner, et al. "Query by image and video content: The QBIC system." Computer 28.9 (1995): 2332. [http://www1.cs.ucy.ac.cy/~nicolast/courses/cs422/ReadingProjects/qbic.pdf]. Retrieved on Sep. 15, 2016, 10 pages.

Hauptmann et al., "Text, Speech, and Vision for Video Segmentation: The Informedia TM Project." Proceeding of AAAI Fall Symposium Computational Models for Integrating Language and Vision, Boston. 1995. [http://lastchance.inf.cs.cmu.edu/alex/aaai95.pdf]. Retrieved on Sep. 15, 2016, 10 pages.

Snoek et al. "The MediaMill TRECVID 2009 semantic video search engine." TRECVID workshop. 2009. [http://epubs.surrey.ac.uk/733282/2/mediamillTRECVID2009final.pdf]. Retrieved on Sep. 15, 2016, 14 pages.

* cited by examiner

| Channel | Program Title | Date, Start-End time | Sentence containing search string | Time in video |
|---|---|---|---|---|
| 100 | World News | 1/10, 1pm-2pm | "Microsoft has named Satya Nadell" | 1:45p |
| 200 | Business News | 1/11, 2pm-2:30pm | "Microsoft down by 100 points" | 2:10p |

FIG. 2

SEARCH FOR CONTENT DATA IN CONTENT

TECHNICAL FIELD

This disclosure relates generally to data searching, e.g., to searching for content data in content.

BACKGROUND

Video content and/or audio content can comprise or be associated with video information (e.g., visual information, such as video relating to a program or an event), audio information (e.g., spoken word), or other information (e.g., program data, metadata). The information available from the program data and metadata can be limited and may not represent, or may not be sufficiently representative of, the actual content of the video content and/or audio content.

The above-described description is merely intended to provide a contextual overview of information associated with content, and is not intended to be exhaustive.

BRIEF DESCRIPTION OF THE DRAWINGS

FIG. 2 presents a diagram of example search results that can comprise information relating to search results obtained in response to a textual search of content, in accordance with various aspects and embodiments of the disclosed subject matter.

DETAILED DESCRIPTION

Figure 1:
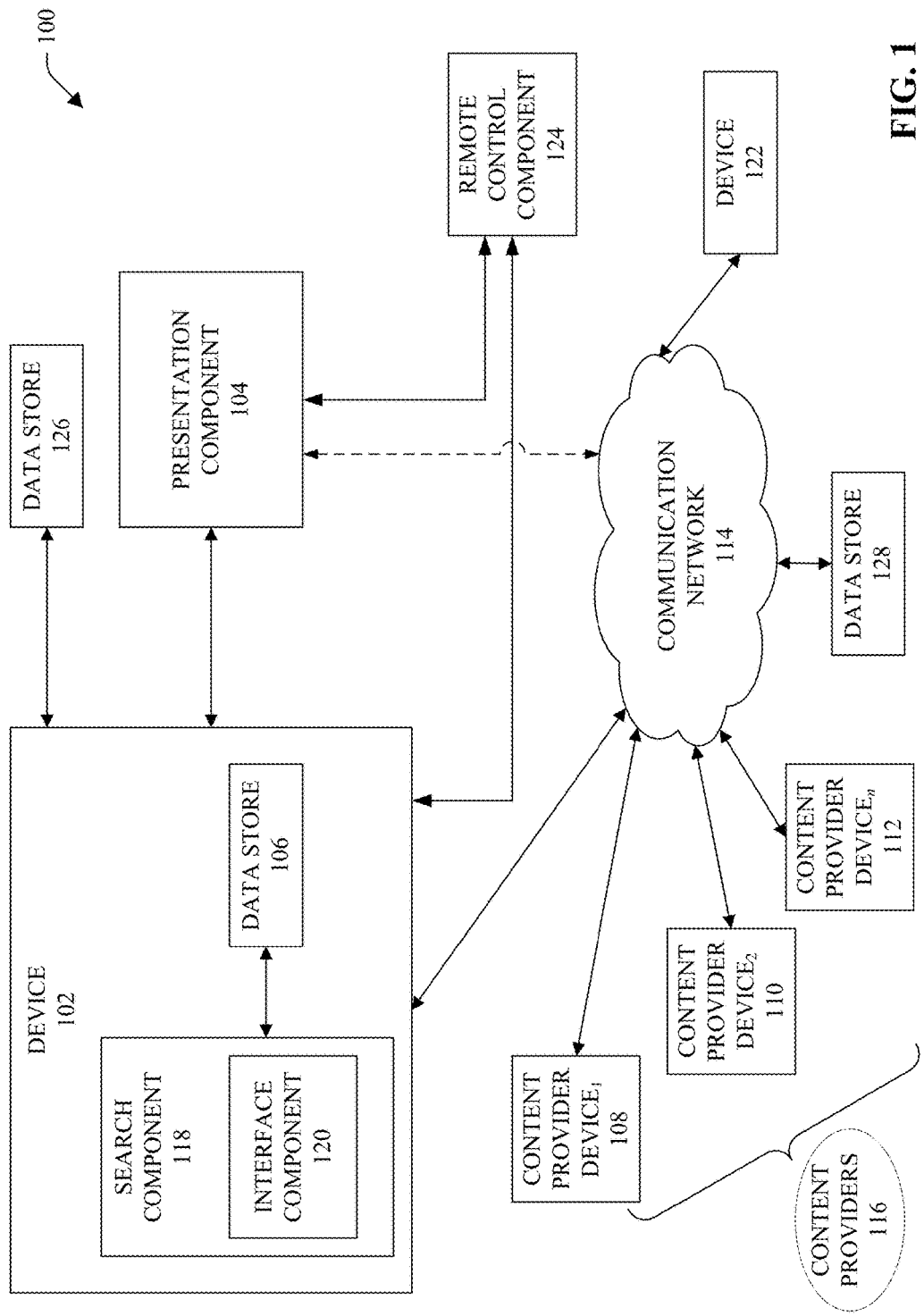
FIG. 1 illustrates a block diagram of an example system that can search content based at least in part on a text search query, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Video content and/or audio content can comprise or be associated with video information (e.g., visual information, such as video relating to a program or an event), audio information (e.g., spoken word), and/or other information (e.g., program data, metadata). Such other information, like program data or metadata, can be limited and may not represent, or may not be sufficiently representative of, the actual content of the video content and/or audio content. For instance, program data may comprise a video title, a short description of the video, or information regarding the cast and crew of the program presented in the video. Metadata may comprise category or genre information (e.g., comedy, drama, action, mystery) associated with the program presented in the video and/or presentation length information regarding the presentation length of the program presented in the video, for example. However, such program data and metadata may not include other information that can be pertinent to some users.

Some conventional search methods can search for program data of video content, such as a title of the video content, a brief description of the video content, cast and/or crew associated with the video content, and/or metadata associated with the video content. The search information derived from such conventional search methods can be of limited and insufficient use to a user who can desire particular information which may be contained in certain video content and/or can desire to know whether the certain video content contains the particular information.

To that end, techniques for searching video and audio content using a text search are presented. A search component can analyze respective items of content (e.g., video content comprising audio, audio content) to identify words spoken in the respective items of content. The search component can generate respective transcripts of the respective words of the respective items of content based on the analysis. In certain implementations, the search component can search for and identify a transcript relating to an item of content, wherein the transcript was generated by another entity or device (e.g., by searching the Internet), and the search component can obtain a copy of the transcript.

The search component can receive a text search comprising a keyword and can analyze the respective transcripts to determine whether one or more of the respective transcripts contains a word that matches or substantially matches the keyword. The search component can generate one or more search results associated with the one or more respective transcripts that contains a word(s) that matches or at least substantially matches the keyword in the text search.

In some implementations, with regard to each search result, the search component can determine the time location(s) in the content where the word(s) is located in the content. The search component can present a time indicator(s) that can indicate a time position(s) in the content that is in proximity to where the word(s) is located in the content of a search result. The presentation of the content can start from a time position associated with a time indicator, for example, in response to a user selecting to play the content or selecting the time indicator. While the video content is playing, the search component also can display the textual information (e.g., words) being spoken in the content, and can highlight or otherwise emphasize the word(s) that corresponds to (e.g., matches or substantially matches) the keyword(s) in the search as the word(s) is being displayed or scrolled across the display screen.

In certain implementations, the search component can be contained in, and executed in, a media device, such as, for example, a set-top box (STB) or set-top unit (STU), which can be associated with (e.g., communicatively connected to) a presentation component (e.g., a television) or another type of communication device (e.g., mobile phone, electronic pad or tablet, electronic notebook, computer, . . . ). For example, a user can use a remote control component or another interface (e.g., interface on the media device or presentation component) associated with the media device or associated presentation component to enter a text search, and the search component of the media device can receive the text search. The search component of the media device can search items of content stored in a data store of the media device or stored in another data store (e.g., an external data store, a server associated with the Internet or intranet, a data store in the cloud) associated with the media device. The search component can generate one or more search results relating to video and/or audio content that contains a word(s) that matches or at least substantially matches the keyword(s) in the text search. The search component can facilitate presenting the one or more search results to the user via the presentation component or other communication device associated with the media device.

These and other aspects and embodiments of the disclosed subject matter will now be described with respect to the drawings.

Referring now to the drawings, FIG. 1 illustrates a block diagram of an example system 100 that can search content (e.g., video content comprising audio information, audio content) based at least in part on a text search query, in accordance with various aspects and embodiments of the disclosed subject matter. The system 100 can comprise a device 102 that can be employed to stream, record, store, and/or present (e.g., communicate, display) content (e.g., media content, such as video content comprising audio information, or audio content) via a presentation (e.g., display) component 104 (e.g., television, video monitor, computer, mobile phone (e.g., smart phone), electronic pad or tablet, electronic notebook, a communication device integrated with a vehicle, a personal digital assistant (PDA), . . . ) that can be connected to the device 102. The device 102 can be or can comprise a media device (e.g., an STB or STU). The presentation of content via the device 102 and the presentation component 104 can be uniquely scheduled by a user in advance (e.g., using a user interface) with no further interaction with the device 102 by the user.

The device 102 can comprise a data store 106 that can store items of content, schedule-related information related to the scheduling of the presentation of respective items of content at respective times, information relating to a user interface that can be provided to the user to facilitate scheduling the presentation of the respective items of content at the respective times, metadata, and/or other information. The items of content, or at least some of the items of content, can be stored in the data store 106, for example, for future presentation of such items of content via the presentation component 104 at desired times.

The device 102 can be associated with (e.g., connected to) a plurality of content provider devices, which can comprise content provider device$_1$ 108, content provider device$_2$ 110, up through content provider device$_n$ 112, wherein n can be virtually any desired number. The plurality of content provider devices (e.g., 108, 110, 112, . . . ) can be associated with the device 102, for example, via a communication network 114, which can comprise a macro communication network and/or a micro or local communication network. The macro communication network can facilitate connecting various devices (e.g., 102, 108, 110, and/or 112, . . . ) to each other via a core network and/or an Internet Protocol (IP)-based network. The micro or local communication network can be or can comprise, for example a local area network (LAN), that can facilitate connecting certain devices (e.g., communication devices) associated with the micro or local communication network to each other and/or to the macro communication network.

Respective devices of the plurality of devices (e.g., 108, 110, 112, . . . ) can be associated with respective content providers of a plurality of content providers 116 that can provide respective items of content to the device 102. The respective content providers of the plurality of content providers 116 can comprise, for example, one or more applications, respective television channels that can be accessed via a cable television service, respective television channels that can be accessed via a satellite television service, respective television channels that can be accessed via a terrestrial television service, one or more video-on-demand services, one or more pay-per-view services, one or more websites, respective radio channels that can be accessed via a cable television service, respective radio channels that can be accessed via a satellite television service, respective radio channels that can be accessed via a terrestrial radio service, or one or more other devices (e.g., a computer, a smart phone, an electronic pad or tablet, an electronic gaming device) that can be associated with the device 102 (e.g., via the micro communication network or the macro communication network).

The system 100 can be employed to search content (e.g., video content comprising audio information (e.g., spoken words) or audio content), and/or other information associated with the content (e.g., program data or metadata associated with content), based on a text search. The program data can comprise, for example, title of the content, a description or summary relating to the content, actors, other artists, or other persons (e.g., crew members, producer, director, engineer) associated with the content. The metadata can comprise, for example, category information (e.g., comedy, drama, action, news, . . . ; television program, movie, . . . ) associated with the content, presentation time length of the content, or data size of the content (e.g., file size). The system 100 can comprise a search component 118 that can search items of content associated with the device 102 (e.g., stored in the data store 106 or in another data source associated with the device 102), and/or the other information respectively associated with the items of content, based at least in part on, and in response to, a search query comprising textual information (e.g., one or more search terms (e.g., keywords)) that can be received from a user, as more fully disclosed herein.

The search component 118 can comprise an interface component 120 that can be employed to facilitate generating a user interface that the user can utilize and interact with to enter search queries, receive search results based on the search queries, and view or perceive content associated with the search results. In some implementations, the interface component 120 can generate and/or utilize a search application (e.g., search engine application) that can be employed to facilitate generating the user interface for use in connection with searching for desired content. As part of the user interface generated by the interface component 120, the user interface can comprise different screens (e.g., interface screens) that the user can interact with in performing a search, viewing search results, and/or viewing content associated with search results. For example, the interface component 120 can generate and facilitate presentation of a first interface screen that can comprise one or more fields that can enable a user to enter a search query comprising search information (e.g., one or more search terms or keywords). The search information can comprise alphanumeric characters (e.g., letters (e.g., A, B, C, . . . ), numbers (1, 2, 3, . . . ; 1.00, 2.00, 3.00, . . . ), and/or other characters (e.g., $, %, -, #, @, . . . ) or information. The user can use the device 102 (e.g., buttons or controls on the device 102), the presentation component 104 (e.g., buttons or controls on the presentation component 104), buttons or controls on another communication device 122 (e.g., mobile phone, electronic pad or tablet, computer, . . . ), or buttons or controls on a remote control component 124 that can be associated with (e.g., communicatively connected to) the device 102 and/or the presentation component 104 (e.g., via a wireless or wireline communication connection).

The first interface screen can receive the search information entered by the user, and can receive a submission of a search command by the user (e.g., when the user hits a "search" button of the first interface screen) in connection with the search information of the search query to enter or submit the search query. The search component 118 can receive the search query comprising the search information, wherein the search information can comprise one or more keywords (e.g., search terms).

In response to receiving the search query, based at least in part on the keyword(s) in the search query, the search component 118 can perform a search of items of content, and/or other information (e.g., program data or metadata respectively associated with the items of content) associated therewith, that can be stored in or located at the data store 106 of the device 102, an external data store 126, and/or another data source(s), to facilitate determining whether one or more items of content, and/or the other information respectively associated therewith, contain a word(s) that corresponds to or at least substantially corresponds to (e.g., matches or at least substantially matches) the keyword(s), in accordance with defined match criteria. The external data store 126 can be local to (e.g., located in the same building and/or associated with a local area network (LAN) with which the device 102 is associated) and associated with (e.g., connected to) the device 102. The other data source(s) can comprise, for example, a data store 128 located in the cloud (e.g., a cloud computing environment) and/or a server(s) or data store(s) associated with one or more of the plurality of content provider devices (e.g., 108, 110, 112, . . . ).

The defined match criteria can define whether a word matches (e.g., is considered a match to) a keyword. As part of a search, and in accordance with (e.g., as specified by) the defined match criteria, the search component 118 can modify or enhance a received search query to facilitate obtaining more desirable (e.g., more relevant, optimal, acceptable, suitable) search results to the search query. For example, the search component 118 can modify or enhance the search query by modifying or enhancing a keyword in the search query to not only use the keyword, but to use other search terms that can be relevant or potentially relevant to the search query, in accordance with the defined match criteria. For instance, the search component 118 also can use a plural version of the keyword (or alternatively, if the keyword is in plural form, the search component 118 can also use the singular form of the keyword when performing the search). The search component 118 also can use can use a different version of the keyword (e.g., for the keyword "seven," the search component 118 can search for "seven" and "7" in the items of content; for the keyword "7", the search component 118 can search for "seven" and "7" in the items of content). The search component 118 also can use synonyms and other related words when searching the items of content as well (e.g., for the keyword "school," the search component 118 also can use the search terms "college," "educational institution," and/or "academy" when performing the search of the items of content).

In connection with performing the search, the search component 118 can analyze the search information in the search query to identify the keyword(s) in the search query. The search component 118 also can analyze the items of content, or associated information (e.g., respective transcripts of respective items of content, respective program data or metadata associated with the respective items of content), to determine whether any of the items of content contain a word(s) that corresponds to or at least substantially corresponds to the keyword(s) in the search query or an associated search term (e.g., a related search term (e.g., a related keyword), such as a plural form of a keyword, a different form of the keyword, a synonym of the keyword, . . . ), based at least in part on the keyword(s) in the search query, in accordance with the defined match criteria.

In some implementations, to facilitate performing the search with regard to the search query, the search component 118 can analyze the respective items of content to identify or determine words spoken in the respective items of content. The search component 118 can generate respective transcripts of the respective words of the respective items of content based at least in part on the results of the analysis. The search component 118 can employ speech and/or voice recognition techniques, functionality, and/or algorithms to facilitate identifying or determining all or a portion of the words spoken in the item of content, and/or identifying different voices of persons and/or the identities of different persons speaking respective words.

In other implementations, the search component 118 can search for and/or obtain one or more transcripts of one or more of the respective items of content from another data source(s). For example, another data source(s) (e.g., a website, a content provider 116 and/or associated content provider device (e.g., 108, 110, or 112), a device associated with a closed-captioning service, an application, . . . ) can have a transcript of the words spoken in an item of content. The search component 118 can search for the transcript, for instance, via a search of the Internet or an intranet, and can obtain a copy of the transcript associated with the item of content from the other data source(s). For instance, a news program may make transcripts of its news broadcasts available for download, or a closed-captioning service may make transcripts of the closed-captioning of a television program or other type of content presentation available for download.

The search component 118 can analyze the keyword(s) associated with the search query and the respective transcripts of the respective items of content (and/or the other information associated with the respective items of content) to determine whether one or more of the respective transcripts (and/or the other information) contains a word(s) that corresponds to or at least substantially corresponds to (e.g., matches or substantially matches) the keyword(s) associated with the search query (e.g., the keyword(s) and/or related keyword(s) determined by the search component 118), in accordance with the defined match criteria.

As part of the analysis of the respective transcripts of the respective items of content, the search component 118 can determine a time location of a word(s) in a transcript(s), based at least in part on the results of the search of the respective transcripts. For instance, the search component 118 can identify time information associated with a word in a transcript, wherein the time information can indicate or specify the time location of the word in the content. If a particular transcript did not include time information indicating the time location of the word in the content, the search component can analyze the item of content associated with the transcript to determine the time location of the word in the content. In some implementations, the search component 118 can use the transcript to estimate a time location in the item of content where the word is spoken, based at least in part on the location of the word in the transcript. For example, if the item of content is 1 hour long, the associated transcript is 100 pages long, and the word appears on page 75 of the transcript, the search component 118 can estimate that the word was spoken approximately 45 minutes into the presentation of the item of content. Based at least in part on this estimation, the search component 118 can analyze a portion of the item of content that is in time proximity to 45 minutes into the item of content.

With regard to each word in an item of content that relates to a keyword associated with the search query, the search component 118 can generate time information and/or an indicator (e.g., a time location indicator) to facilitate indicating a time location in the item of content where the word is located. The search component 118 can include the time information, which can indicate the time location in the item of content where the word is located, in the search results. The search component 118 (including the interface component 120) can present (e.g., display) the time location indicator on or in proximity to a content timeline associated with the item of content to facilitate indicating, to the user, the time location in the item of content where the word is spoken and/or to enable presentation of the item of content from a point near (e.g., in proximity to, but prior to) the time location in the item of content where the word is located, as more fully disclosed herein. For example, on a timeline (e.g., content timeline) associated with the item of content, the search component 118 can, insert, place, or position, the time location indicator in proximity to (e.g., within a defined amount of time prior to) the time location where the word is spoken in the item of content.

Based at least in part on the results of the analysis of the keyword(s) associated with the search query and the respective transcripts, the search component 118 can generate one or more search results associated with the one or more respective transcripts that contains a word(s) that corresponds to or at least substantially corresponds to (e.g., matches or at least substantially matches) the keyword(s) associated with the search query), in accordance with the defined match criteria. In some implementations, the search component 118 can rank the search results based at least in part on how close the respective search results are determined (e.g., by the search component 118) to satisfy the search query, in accordance with the defined match criteria. For example, a search result associated with a transcript of an item of content that contains words that more substantially match a keyword(s) associated with the search query than other search results associated with other transcripts of other items of content can be ranked higher than the other search results. As another example, a search result associated with a transcript of an item of content can be ranked higher than other search results associated with transcripts of other items of content, when the transcript contains a word(s), which corresponds to a keyword(s) associated with the search query, that is recited more frequently in the transcript than the respective frequencies that such word(s) appears in the other transcripts.

The search component 118 (e.g., the interface component 120) can facilitate presenting the search results to the user by communicating the search results to the presentation component 104 or communication device 122 associated with the user. The search results can comprise various items of information (e.g., search result information) that can be relevant to the user when reviewing the search results. The interface component 120 can generate a second interface screen (e.g., search results interface screen) on which the search results can be displayed. The second interface screen comprising the search results can be presented (e.g., displayed) on a display screen of the presentation component 104 or a display screen of the communication device 122.

Referring briefly to FIG. 2 (along with FIG. 1), FIG. 2 presents a diagram of example search results 200 that can comprise information relating to search results obtained in response to a textual search of content, in accordance with various aspects and embodiments of the disclosed subject matter. The user can enter a search query comprising the search term (e.g., keyword) "Microsoft" via an interface screen (e.g., search interface screen) that can be generated by the interface component 120. The search component 118, using the search term "Microsoft," can search and/or analyze items of content (e.g., items of video content), and/or transcripts of the items of content, stored in the data store 106, stored in another data store(s) (e.g., data store 126), and/or obtained from another data source(s) (e.g., a website, an application, . . . ) to determine whether any of the items of content contain the search term "Microsoft." As illustrated in the example search results 200, the search component 118 can determine that two items of content of the respective items of content contain the search term "Microsoft," and the search component 118 can generate the search results 200 relating to those two items of content, based at least in part on the results of the analysis using the search term "Microsoft."

The example search results 200 can comprise a first search result 202 and a second search result 204, which can be presented (e.g., displayed) on the second interface screen (e.g., the search results interface screen), which can be generated by the interface component 120, and provided to the presentation component 104 or communication device 122. The search results 200 can comprise various items of information relating to the first search result 202 and second search result 204. For instance, the search results 200 can comprise channel information 206 (and/or source information), wherein, as shown in the example search results 200, the first item of content (e.g., first television program) associated with the first search result 202 was presented on channel 100, and the second item of content (e.g., second television program) associated with the second search result 204 was presented on channel 200. In some implementations, the channel information 206 can comprise channel and/or source information, wherein the source information can relate to an application, a website name or website address (e.g., uniform resource locator (URL)), a communication device, and/or another source that is the source that provided the item of content.

The search results 200 also can include program title information 208, wherein, as shown in the example search results 200, the first item of content associated with the first search result 202 is named "World News," and the second item of associated with the second search result 204 is named "Business News." The search results 200 further can comprise date and time information 210, wherein, as shown in the example search results 200, the first item of content associated with the first search result 202 was presented (e.g., aired on television) on January 10th, starting at 1:00 p.m. and ending at 2:00 p.m., and the second item of associated with the second search result 204 was presented on January 11th, starting at 2:00 p.m. and ending at 2:30 p.m.

The search results 200 also can include search term related information 212 (e.g., sentence containing search string), wherein, as shown in the example search results 200, the first search result 202 can indicate that the first item of content includes the words "Microsoft has named Satya Nadell," and the second search result 204 can indicate that the second item of content contains the words "Microsoft down by 100 points." The search results 200 can comprise time location information 214 (e.g., time in video), wherein, as shown in the example search results 200, the first search result 202 can indicate that the word (e.g., "Microsoft") corresponding to the search term ("Microsoft") is located in the first item of content at 1:45 p.m., and the second search result 204 can indicate that the word (e.g., "Microsoft") corresponding to the search term ("Microsoft") is located in the second item of content at 2:10 p.m.

The user can review the search results 200 on the display screen of the presentation component 104 or the display screen of the other communication device 122. If the user desires, the user can select a search result(s) (e.g., first search result 202) to view the associated item of content and/or other information relating to the item of content.

Figure 3:
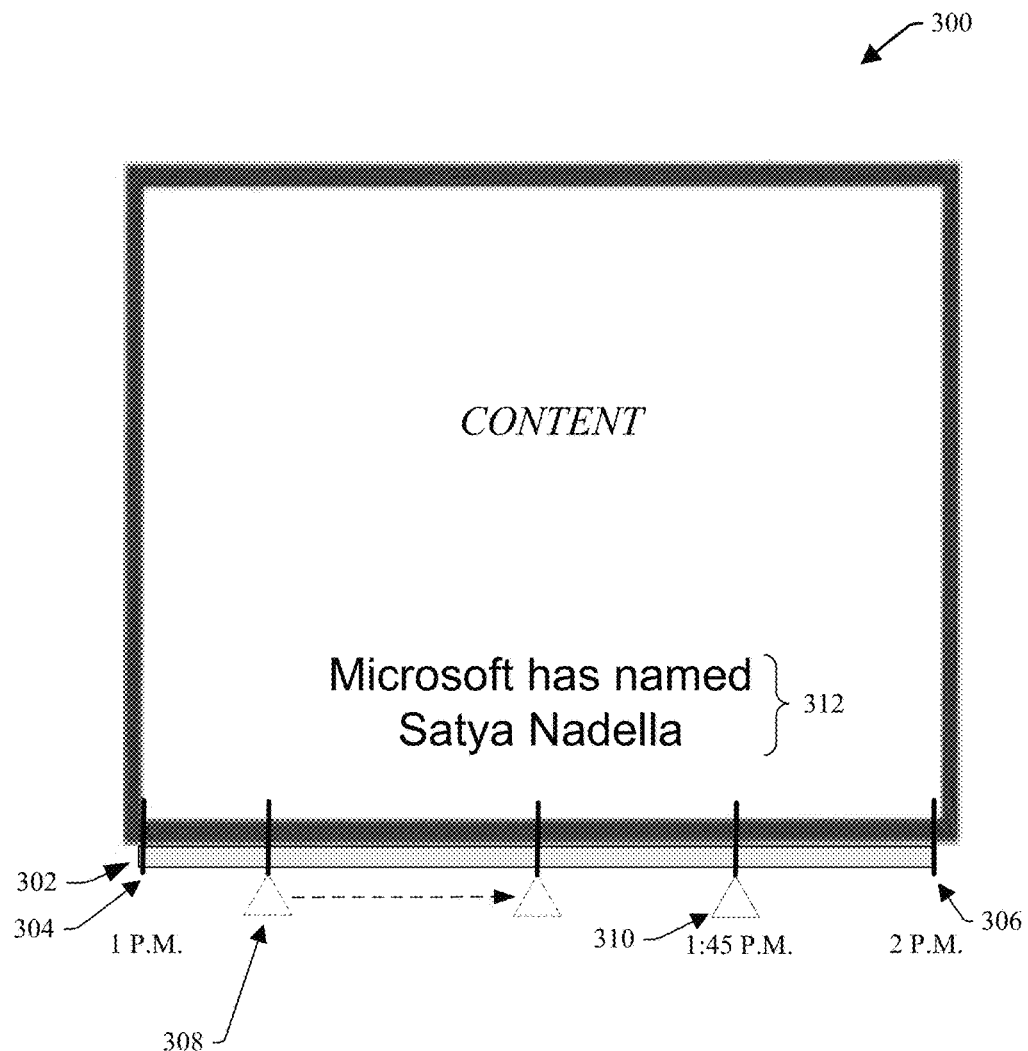
FIG. 3 illustrates a diagram of an example display screen that can comprise information relating to the time location of a word in content in connection with a textual search for the word in the content, in accordance with various aspects and embodiments of the disclosed subject matter.

Turning briefly to FIG. 3 (along with FIGS. 1 and 2), FIG. 3 illustrates a diagram of an example display screen 300 that can comprise information relating to the time location of a word in content in connection with a textual search for the word in the content, in accordance with various aspects and embodiments of the disclosed subject matter. In response to the user selecting the first search result 202 on the search result interface screen, the search component 118 can receive the selection information indicating that the first search result 202 has been selected. Based at least in part on the selection information, the search component 118 (including the interface component 120) can facilitate generating and presenting a third interface screen (e.g., a content interface screen) that can comprise the first item of content (e.g., "World News"), wherein the third interface screen can be presented on the display screen (e.g., 300) of the presentation component 104 (or the other communication device 122).

The display screen 300 can include a content timeline 302 (e.g., content timeline bar) that can show the presentation timeline associated with the first item of content. For example, the content timeline 302 for the first item of content can be displayed showing a start point 304 (e.g., start time) of 1 p.m. and an end point 306 (e.g., end time) of 2 p.m., because the first item of content (e.g., "World News") had originally been presented from 1 p.m. to 2 p.m. on January 10th. The user can use (e.g., select) a button(s) or control(s) (e.g., button or control on the remote control component 124, a mouse, keyboard keys) to play all or a portion of the first item of content. For example, the user can press a "play" button on the remote control component 124. The search component 118 can receive the "play" command, and, in response, the search component 118 can begin communicating the first item of content, or a portion thereof, to the presentation component 104 for presentation of the first item of content on the display screen 300 by the presentation component 104.

As desired, the user can select a button or control to move a content time indicator 308 from one time location along the content timeline 302 to another time location along the content timeline 302. For example, the content time indicator 308 can be located at a first time location (e.g., 1:10 p.m.), and the user can select and/or use a button or control to move, drag, or re-locate the content time indicator 308 along the content timeline 302 from the first time location to a second time location (e.g., 1:30 p.m.) to facilitate playing the first item of content beginning at the second time location rather than the first time location. In response to the selection and/or use of the button or control to move the content time indicator 308, the search component 118 can correspondingly move, drag, or re-locate the content time indicator 308 from the first time location to the second time location along the content timeline 302.

In connection with the first search result 202, the content timeline 302 presented in the display screen 300 also can include a search term indicator 310 (e.g., time indicator associated with the search term) that can indicate the time location (e.g., 1:45 p.m.) in the first item of content where the word (e.g., "Microsoft") corresponding or at least substantially corresponding to the search term (e.g., "Microsoft") is presented (e.g., spoken). In accordance with various implementations, the user can select a "play" button or can select the search term indicator 310 to cause the first item of content to begin playing at a time location in proximity to (e.g., within a defined amount of time prior to) the time location (e.g., 1:45 p.m.) in the first item of content where the word is presented. In response to the user selecting the "play" button or the search term indicator 310 (e.g., using the remote control component, mouse, or keyboard keys), the search component 118 can receive such selection information. In response, the search component 118 can begin playing the first item of content at the time location that is in proximity to (e.g., within a defined time prior to) the time location (e.g., 1:45 p.m.) in the first item of content where the word is presented (e.g., where the word is spoken). For example, the search component can begin playing the first item of content approximately five seconds or another desired amount of time prior to the time location in the first item of content where the word is presented. If there is more than one instance in the first item of content where the word is presented (e.g., spoken), the search component 118 (including the interface component 120) can facilitate generating and presenting respective search term indicators (e.g., 310) at respective time locations along the content timeline 302 where the word is presented in the first item of content.

In connection with the presentation of the first item of content, or portion thereof, on the display screen 300, as the first item of content is presented on the presentation component 104 (or communication device 122), during the presentation of the portion of the first item of content that contains the word (e.g., "Microsoft") corresponding or substantially corresponding to the search term (e.g., "Microsoft"), the search component 118 (including the interface component 120) can facilitate presentation of the textual information 312 (e.g., a word string or sentence(s)) corresponding to the word and a subset of associated words prior to and/or after the word in the first item of content as the audio information (e.g., speech) corresponding to the word and the subset of associated words is being spoken. For example, the search component 118 can facilitate presenting a sentence or a sentence fragment comprising the word (e.g., "Microsoft has named Satya Nadella") in text (e.g., textual information 312) on the display screen 300 at or near the time that the sentence or sentence fragment is being spoken in the first item of content.

Figure 4:
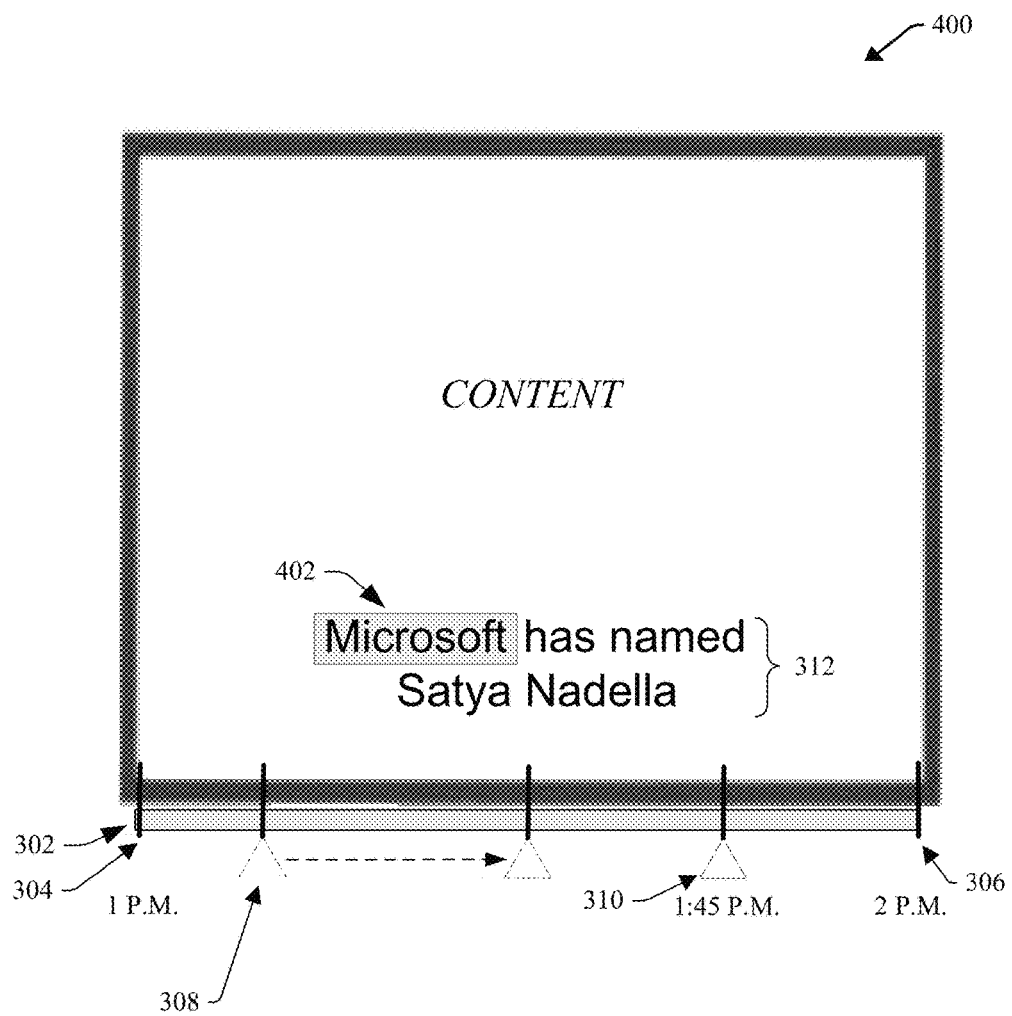
FIG. 4 presents a diagram of another example display screen that can comprise highlighted or otherwise emphasized information relating to the time location of a word in content in connection with a textual search for the word in the content, in accordance with various aspects and embodiments of the disclosed subject matter.

In some implementations, the search component 118 (including the interface component 120) can facilitate highlighting or otherwise emphasizing certain text, such as the word(s) that corresponds or at least substantially corresponds to (e.g., matches or substantially matches) the keyword(s) associated with the search query, as textual information is being presented on the display screen in connection with the presentation of the content on the presentation component 104 (or communication device 122). Referring briefly to FIG. 4 (along with FIGS. 1, 2, and 3), FIG. 4 presents a diagram of another example display screen 400 that can comprise highlighted or otherwise emphasized information relating to the time location of a word in content in connection with a textual search for the word in the content, in accordance with various aspects and embodiments of the disclosed subject matter.

As described, in connection with the presentation of the first item of content, or portion thereof, on the display screen 400, as the first item of content is presented on the display screen 400 of the presentation component 104 (or communication device 122), during the presentation of the portion of the first item of content that contains the word (e.g., "Microsoft") corresponding or substantially corresponding to the search term (e.g., "Microsoft"), the search component 118 can facilitate presentation of textual information 312 (e.g., a word string or sentence(s)) corresponding to the word and a subset of associated words prior to and/or after the word in the first item of content as the audio information corresponding to the word and the subset of associated words is being spoken. For example, the search component 118 can facilitate presenting a sentence or a sentence fragment comprising the word (e.g., "Microsoft has named Satya Nadella") in text (e.g., textual information 312) on the display screen 400 at or near the time that the sentence or sentence fragment is being spoken in the first item of content. The search component 118 (including the interface component 120) also can highlight or otherwise emphasize certain text, such as the word(s) that corresponds or substantially corresponds to the search term(s) as the word(s) is presented on and/or scrolled across the display screen 400. For example, as depicted on the display screen 400, the word (e.g., "Microsoft") that corresponds or substantially corresponds to the search term (e.g., "Microsoft") can be highlighted or emphasized by surrounding the word with a block 402 of a desired color (e.g., yellow, green, or other desired color).

It is to be appreciated and understood that, in accordance with various implementations, other types of highlighting or emphasizing a word can be employed by the search component 118. For example, the search component 118 (including the interface component 120) can change the color of the alphanumeric characters of the word relative to the color of the characters of the other words in proximity to the word, can enlarge the size of the alphanumeric characters of the word relative to the size of the other alphanumeric characters of the other words, and/or can place an indicator icon in proximity to the word to emphasize or draw attention to the word.

Figure 5:
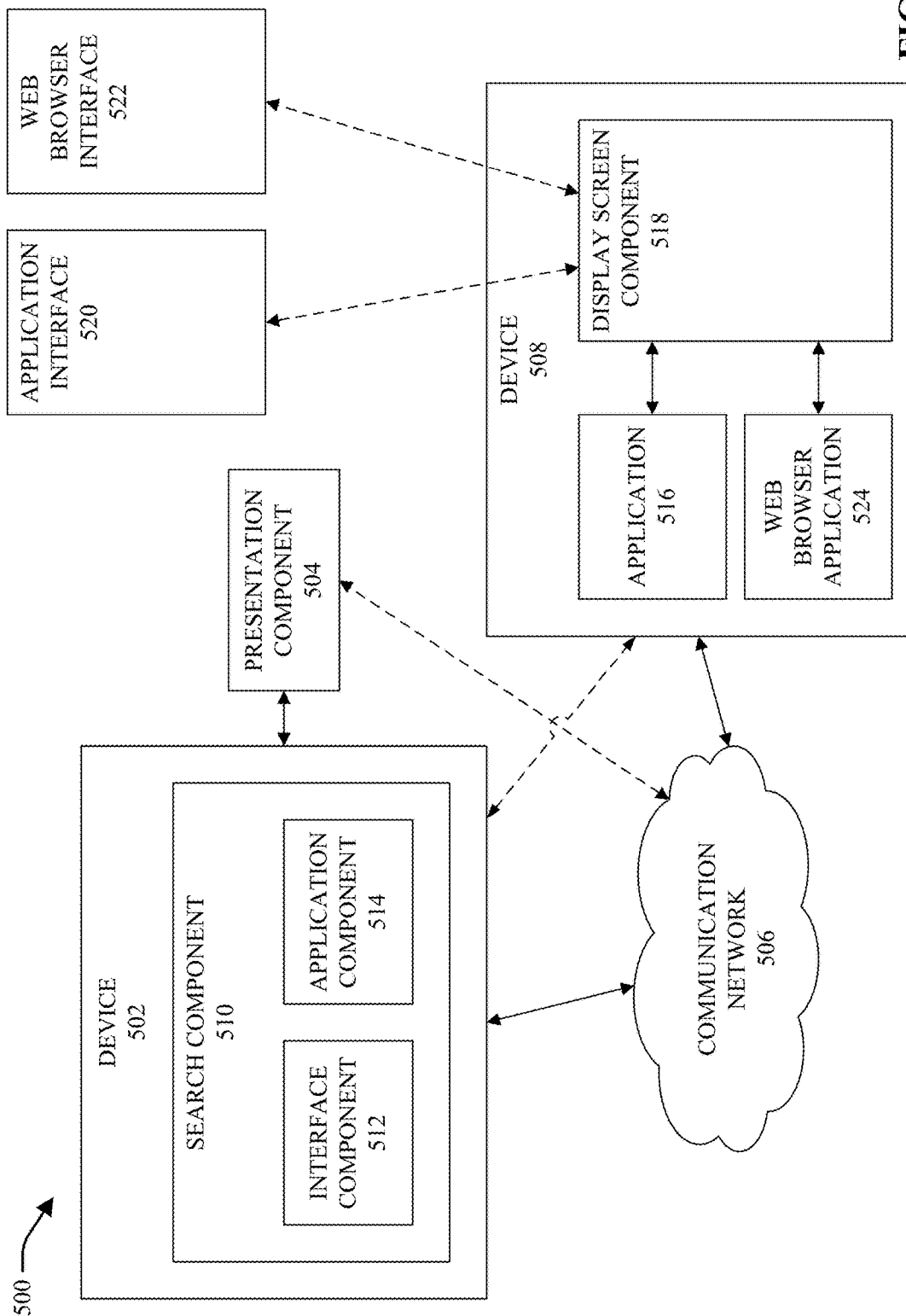
FIG. 5 depicts a block diagram of an example system that can employ an application or web browser to facilitate searching content based at least in part on a text search query, in accordance with various aspects and embodiments of the disclosed subject matter.

FIG. 5 depicts a block diagram of an example system 500 that can employ an application or web browser to facilitate searching content (e.g., video content comprising audio information, audio content) based at least in part on a text search query, in accordance with various aspects and embodiments of the disclosed subject matter. The system 500 can comprise a device 502, which can be a media device (e.g., an STB or STU), that can be employed to stream, record, store, and/or present (e.g., communicate, display) content (e.g., video content, audio content) via a presentation component 504 (e.g., television, video monitor, computer, mobile phone, electronic pad or tablet, a communication device integrated with a vehicle, PDA, . . . ) that can be associated with (e.g., connected to) the device 502.

The system 500 also can comprise a communication network 506, and the device 502 and/or the presentation component 504 can be associated with (e.g., communicatively connected to) the communication network 506 via a wireline (e.g., wired) or wireless communication connection. A communication device 508 (e.g., a mobile phone, computer, electronic notebook, electronic pad or tablet, electronic gaming device, PDA, communication device integrated with a vehicle) also can be associated with (e.g., communicatively connected to) the communication network 506 via a wireline or wireless communication connection.

The device 502, the communication device 508, and/or the presentation component 504 can operate and communicate in a communication network environment. At various times, the communication device 508 (and/or the device 502 and/or the presentation component 504) can be communicatively connected via a wireless communication connection(s) to one or more radio access networks (RANs) (not shown), which can comprise one or more base stations (not shown) to communicatively connect the communication device 508 (and/or the device 502 and/or the presentation component 504) to the communication network 506 to enable the communication device 508 (and/or the device 502 and/or the presentation component 504) to communicate with other communication devices associated with (e.g., communicatively connected to) the communication network 506 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 506 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; etc. The communication network 506 (e.g., a core network, or a network comprising a core network and/or an IP-based network) can facilitate routing voice and data communications between a communication device(s) (e.g., communication device 508) and other communication devices (e.g., device 502) associated with the communication network 506 in the communication network environment. The communication network 506 also can allocate resources to the communication devices (e.g., communication device 508, device 502, and/or the presentation component 504) or other communication devices in the communication network 506, convert or enforce protocols, establish and enforce quality of service (QOS) for the communication devices, provide applications or services in the communication network 506, translate signals, and/or perform other desired functions to facilitate system interoperability and communication in the communication network 506 (e.g., wireless portion of the communication network 506 or wireline portion of the communication network 506). The communication network 506 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices (e.g., communication device 508, device 502, and/or the presentation component 504) in the communication network environment.

As a communication device(s) (e.g., communication device 508, device 502, and/or the presentation component 504) is moved through a wireless communication network environment, at various times, the communication device(s) (e.g., communication device 508, device 502, and/or the presentation component 504) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., UE functioning as a mobile hotspot)) that can operate in the wireless communication network environment. An AP (e.g., base station) can serve a specified coverage area to facilitate communication by the communication device(s) (e.g., communication device 508, device 502, and/or the presentation component 504) or other communication devices in the wireless communication network environment. An AP can serve a respective coverage cell (e.g., macrocell, femtocell, picocell, etc.) that can cover a respective specified area, and the AP can service mobile wireless devices, such as the communication device(s) (e.g., communication device 508, device 502, and/or the presentation component 504), located in the respective area covered by the respective cell, where such coverage can be achieved via a wireless link (e.g., uplink (UL), downlink (DL)). When an attachment attempt is successful, the communication device(s) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) can be connected and can communicate wirelessly using virtually any desired wireless technology, including, for example, cellular, Wi-Fi, Wi-Max, wireless local area networks (WLAN), etc.

In some implementations, the communication device 508 can be connected (e.g., directly connected) with the device 502 (e.g., via a micro communication network or personal area network (PAN)) using, for example, one or more various types of wireless communication technology, such as, for example, Bluetooth technology, Wi-Fi technology, ZigBee technology, near field communication (NFC) technology, etc., to facilitate communicating information (e.g., search queries, search results, other information) between the communication device 508 and the device 502.

The device 502 can comprise a search component 510 and an interface component 512, wherein the search component 510 can be employed to perform searches of items of content and/or information (e.g., transcript associated with an item of content, program data associated with an item of content, metadata associated with an item of content) associated therewith, as more fully disclosed herein. The interface component 512 can be employed to generate and present one or more interface screens that can be used to facilitate entering search queries, presenting search results to a user, and/or presenting content and related information to the user, as more fully disclosed herein. In accordance with various implementations, the search component 510 can comprise (as depicted in FIG. 5) or be associated with (e.g., connected to) an application component 514 that can be employed to generate and provide an application 516 (e.g., a search application) to a communication device (e.g., communication device 508). For instance, the communication device 508 (e.g., as instructed by the user) can download the application 516 from the application component 514 to the communication device 508 or can otherwise obtain and/or access the application 516. The application 516 can operate in conjunction with the search component 510 and interface component 512 to facilitate performing searches of items of content and/or information associated therewith, generating search results based on search queries, and presenting content associated with search results, as desired by a user of the communication device 508 and the application 516. The application 516 also can be used by the presentation component 504 (and/or a remote control component (as shown in FIG. 1; not shown in FIG. 5)) via the application component 514 of the search component 510.

The communication device 508 can comprise a display screen component 518 that can be used to view information, content, etc. The display screen component 518 can comprise a touchscreen display or can be associated with a keyboard or keypad (not shown in FIG. 5) that can be used to enter information, including schedule-related information. The application 516, operating in conjunction with the search component 510 and interface component 512, can be employed to facilitate presenting an application interface 520 on the display screen component 518, wherein the application interface 520 can comprise or facilitate the presentation (e.g., display) of interface screens (e.g., the first interface screen (e.g., a search interface screen), second interface screen (e.g., a search results interface screen), third interface screen (e.g., a content interface screen), or interface screens that can be similar to such interface screens), content, and/or other information or objects on the display screen component 518.

Using the interface screens presented via the application interface 520 presented on the display screen component 518 of the communication device 508, the user can enter information, such as search-related information (e.g., search queries comprising search terms), via an interface screen(s) to facilitate performing searches of items of content and/or information associated therewith, generating search results based on search queries, and presenting search results and content associated with the search results via the presentation component 504 (or the communication device 508), as more fully disclosed herein. The search-related information and/or other information (e.g., user preferences) can be communicated from the communication device 508 to the search component 510 of or associated with the device 502 via the communication network 506. The search component 510 can perform searches of respective items of content and/or respective information associated therewith, identify or determine search results responsive to the searches, and/or facilitate presenting respective items of content and/or other information associated with the search results, based at least in part on the search-related information received from the communication device 508.

Additionally or alternatively, the interface component 512 can facilitate presenting (e.g., communicating) interface screens (e.g., the first interface screen, second interface screen, third interface screen, or interface screens that can be similar to such interface screens) on a web browser interface 522 that can be accessed or opened by the communication device 508. For example, the communication device 508 can open a web browser using a web browser application 524. The user can enter information into the web browser to access a website associated with the search component 510. Via the website, the interface component 512 can facilitate providing (e.g., communicating) the interface screens to the communication device 508 via the communication network 506.

Using the interface screens via the web browser interface 522 presented on the display screen component 518 of the communication device 508 (and associated interfaces provided by the web browser and communication device 508), the user can enter information, such as search-related information (e.g., search queries comprising search terms), via an interface screen(s) to facilitate performing searches of items of content and/or information associated therewith, generating search results based on search queries, and presenting search results and content associated with the search results via the presentation component 504 (or the communication device 508), as more fully disclosed herein. The search-related information and/or other information (e.g., user preferences) provided via the interface screens on the web browser interface 522 can be communicated from the communication device 508 to the search component 510 of or associated with the device 502 via the communication network 506. The search component 510 can perform searches of respective items of content and/or respective information associated therewith, identify or determine search results responsive to the searches, and/or facilitate presenting respective items of content and/or other information associated with the search results, based at least in part on the search-related information received from the communication device 508.

Figure 6:
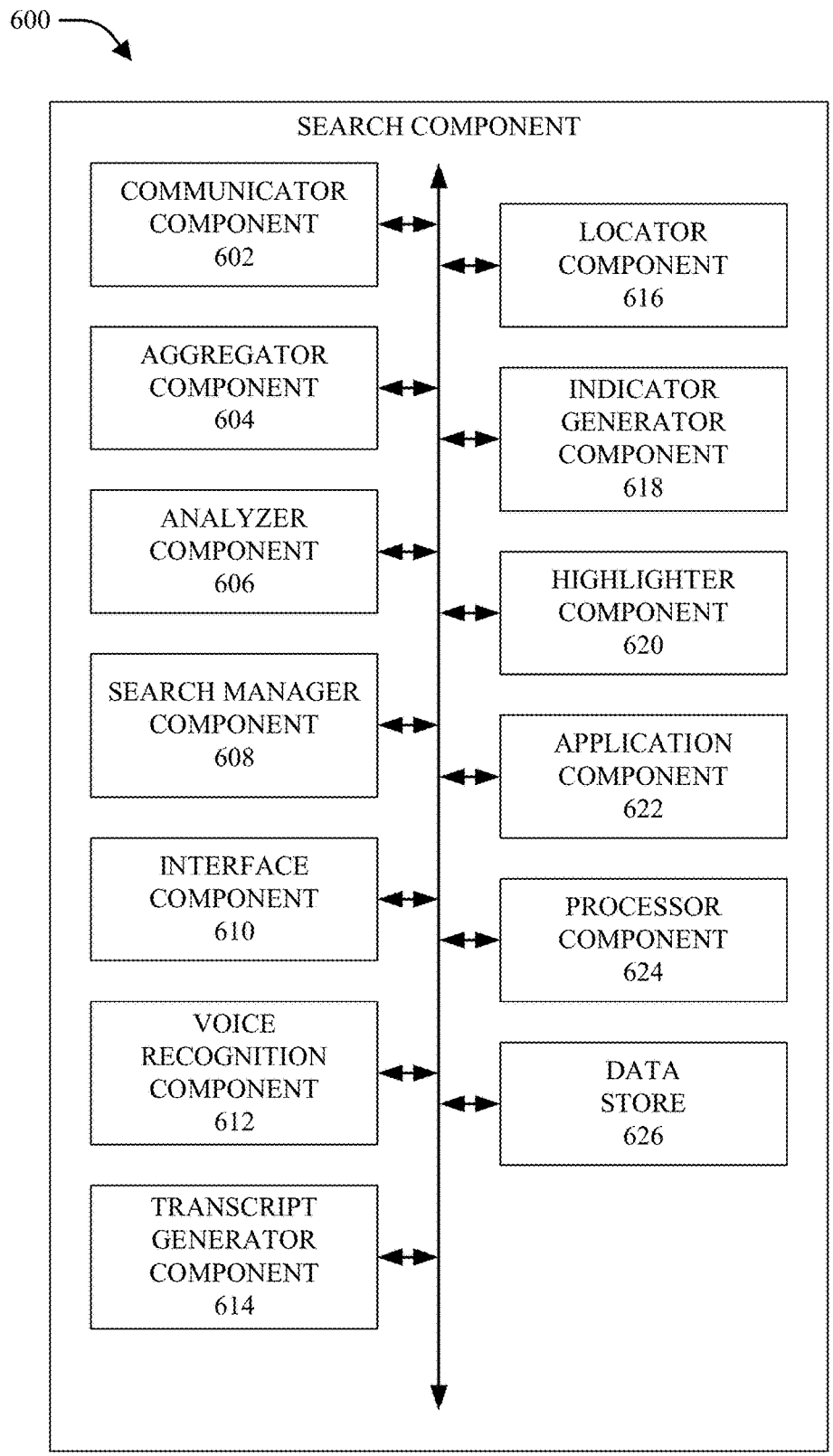
FIG. 6 illustrates a block diagram of an example search component, in accordance with various aspects and embodiments of the disclosed subject matter.

FIG. 6 illustrates a block diagram of an example search component 600, in accordance with various aspects and embodiments of the disclosed subject matter. The search component 600 can be employed to perform searches of respective items of content and/or respective information associated therewith, identify or determine search results responsive to the searches, and/or facilitate presenting respective items of content and/or other information associated with the search results, based at least in part on the search-related information (e.g., search queries), as more fully disclosed herein. In accordance with various implementations, all or part of the search component 600 can reside in a device, such as a media device (e.g., STB or STU). In some implementations, all or part of the search component 600 can reside in a cloud (e.g., a cloud computing environment).

The search component 600 can comprise a communicator component 602 that can transmit information from the search component 600 to another component or device (e.g., presentation component, communication device, devices associated with content providers) and/or can receive information from the other component or device. For instance, to facilitate performing a search of content, the communicator component 602 can receive search-related information (e.g., a search query comprising a search term(s) (e.g., keyword(s)) from a communication component (e.g., a remote control component) associated with the device or from a communication device associated with the communication network. The communicator component 602 also can receive content from devices associated with content providers. The communicator component 602 also can communicate search results responsive to a search query and/or items of content associated with the search results to a presentation component or other communication device associated with a user (e.g., the user who submitted the search query). The communicator component 602 also can communicate content to the presentation component or other communication device associated with the user for presentation by the presentation component or communication device.

The search component 600 also can include an aggregator component 604 that can aggregate data received (e.g., obtained) from various entities (e.g., communicator component 602 or another component(s) of the search component 600, communication network, an application, a server (e.g., content provider device) or other communication device, processor, data store, etc.). The aggregator component 604 can aggregate or correlate respective items of data (e.g., search-related information) based at least in part on type of data (e.g., search-related information, content-related data of respective items of content, application-related data, Internet-related data, respective program data associated with respective items of content, respective metadata associated with respective items of content, signaling, messaging data), source of the data, time or date that the data was generated or received, etc., to facilitate analyzing of the data by the analyzer component 606. For example, the aggregator component 604 can aggregate data (e.g., content-related information, data of transcripts associated with respective items of content, search-related information) associated with respective content or respective search queries or search results to facilitate performing searches of respective items of content based on search queries, determining or identifying items of content responsive and/or relevant to a search query, generating search results comprising or associated with the items of content that are responsive and/or relevant to a search query, and/or presenting the search results and associated items of content to a user (e.g., via a presentation component or other communication device).

The search component 600 can comprise analyzer component 606, which can analyze data (e.g., search-related information comprising a search query, items of content, content-related information (e.g., respective program data or respective metadata associated with respective items of content)) to facilitate performing searches of respective items of content based on search queries, determining or identifying items of content responsive and/or relevant to a search query, generating search results comprising or associated with the items of content that are responsive and/or relevant to a search query, and/or presenting the search results and associated items of content to a user, etc.

For example, the analyzer component 606 can analyze and/or parse information (e.g., search-related information) in a search query to identify or determine one or more keywords in the search query. The analyzer component 606 can analyze items of content to identify or determine words spoken in the content, and/or respective time locations of respective words spoken in the items of content, based at least in part on the analysis results, to facilitate generation of respective transcripts associated with the respective items of content, and/or to facilitate generation of time location information indicating the respective locations of the respective words in the respective transcripts. The analyzer component 606 also can analyze the respective transcripts and/or respective other information (e.g., program data, metadata) associated with respective items of content to facilitate determining whether any of the items of content contain a word(s) that corresponds or at least substantially corresponds to a keyword(s) associated with a search query, in accordance with the defined match criteria, to facilitate generation of search results that can be responsive and/or relevant to a search query.

In accordance with various implementations, the search component 600 also can comprise a search manager component 608, an interface component 610, a voice recognition component 612, a transcript generator component 614, a locator component 616, an indicator generator component 618, a highlighter component 620, and an application component 622. The respective components (e.g., search manager component 608, interface component 610, voice recognition component 612, transcript generator component 614, locator component 616, indicator generator component 618, highlighter component 620, application component 622) can comprise the respective features and functions, such as more fully described herein (e.g., including as more fully described herein with regard to the search component).

The search manager component 608 can control (e.g., manage) operations associated with the search component 600. For example, the search manager component 608 can facilitate generating instructions to have components of the search component 600 perform operations, and can communicate respective instructions to respective components (e.g., communicator component 602, aggregator component 604, analyzer component 606, . . . ) of the search component 600 to facilitate performance of operations by the respective components of the search component 600 based at least in part on the instructions, in accordance with defined algorithms (e.g., search algorithm(s), voice recognition algorithm(s)). The search manager component 608 also can facilitate controlling data flow between the respective components of the search component 600 and controlling data flow between the search component 600 and another component(s) or device(s) (e.g., communication device, presentation component, content provider device, device of the communication network) associated with (e.g., connected to) the search component 600.

The search manager component 608 also can manage and perform searches of content (e.g., video content comprising audio information, or audio content) based at least in part on search queries (e.g., textual search queries) received from users via the device, the presentation component, the remote control component, or other communication device. The search manager component 608 can generate one or more respective search results, comprising or relating to respective items of content, wherein the one or more respective search results can be responsive and/or relevant to a search query.

The interface component 610 can generate and/or utilize a search application that can be employed to facilitate generating a user interface, comprising one or more different interface screens. Using a device or component (e.g., the device (e.g., STB), remote control component, presentation component, other communication device), a user can interact with the one or more interface screens to generate (e.g., enter) and submit (e.g., transmit) a search query to facilitate searching for content responsive or relevant to the search query, view or access search results, view or access content, view information related to respective items of content, view and/or set user preferences related to searching or viewing content, etc. For example, the interface component 610 can generate a first interface screen that can comprise one or more fields in which data (e.g., search terms) can be entered to facilitate generating and submitting a search query, a second interface screen that can present search results, comprising search result related information, that can be responsive and/or relevant to a search query, a third interface screen that can present respective items of content associated with the search results and/or other related information (e.g., time location indicator associated with a word that at least substantially corresponds to a keyword of the search query; highlighting or emphasizing information associated with the word), and/or another interface screen(s).

The interface component 610 also can facilitate adapting or modifying interface screens for use with different devices or applications. For example, the first interface screen, second interface screen, or third interface screen can be respectively adapted for use via a presentation component (e.g., a television) that has one set of characteristics (e.g., display characteristics, such as display screen size and resolution) and via a communication device (e.g., mobile phone, electronic pad or tablet) that can have a different set of characteristics (e.g., different display characteristics, such as a relatively smaller display screen size than the display screen size of a television set). As another example, the first interface screen, second interface screen, or third interface screen can be respectively adapted for use via an application (e.g., used with a communication device) or via a web browser.

The interface component 610 can be employed to facilitate receiving information (e.g., information relating to search queries, user preference information) from a device or component (e.g., the device, presentation component, remote control component, communication device) associated with the user, and communicating information (e.g., content, search results) to the device or component associated with the user.

The voice recognition component 612 can operate in conjunction with the analyzer component 606 to analyze content to facilitate identifying or determining words spoken in the content. The voice recognition component 612 can employ speech and/or voice recognition techniques, functionality, and/or algorithms to facilitate identifying or determining all or a portion of the words spoken in an item of content, and/or identifying different voices of persons and/or the identities of different persons speaking respective words in the item of content.

The transcript generator component 614 can generate a transcript of words determined or identified to be spoken in an item of content based at least in part on the results of an analysis of the item of content. The transcript also can include time location information that can indicate the respective time locations of respective words where the respective words are spoken in the item of content to facilitate efficiently accessing the portion of the item of content where a particular word is spoken.

The locator component 616 can determine or identify respective time locations of respective words where the respective words are spoken in an item of content, based at least in part on the results of an analysis of the item of content or a transcript associated with the item of content, to facilitate efficiently accessing the portion of the item of content where a particular word is spoken. The locator component 616 can determine or identify the respective time locations of the respective words in the content for all or a desired portion (e.g., a word(s) corresponding or substantially corresponding to a keyword(s) of a search query; words other than words (e.g., "the," "a," "an," and the like) that can be determined to be insignificant) of the respective words.

The indicator generator component 618 can generate and facilitate presentation of time indicators that can correlate to time locations of words spoken in an item of content. For instance, with regard to an item of content associated with a search result responsive to a search query associated with a keyword, the indicator generator component 618 can operate in conjunction with the interface component 610 to present a time indicator that can be located at a time location on the content timeline where a word is spoken in the item of content, wherein the word is determined to correspond or substantially correspond to the keyword, in accordance with the defined match criteria. In some implementations, a user can select (e.g., click on) the time indicator to begin presentation of a portion of the item of content beginning at a desired time in proximity to (e.g., within a defined amount of time prior to) the time location where the word is spoken in the item of content.

The highlighter component 620 can highlight or emphasize certain textual information, such as a word that corresponds or substantially corresponds to a keyword associated with a search query, as such certain textual information is being presented with an item of content on a display screen of a presentation component or other communication device associated with the device. The search manager component 608 can determine and/or generate textual information (e.g., all or a portion of the words spoken in an item of content) that can be presented in connection with the presentation of the item of content, or portion thereof, on a display screen of the presentation component or other communication device associated with the device.

For example, the search manager component 608 can determine that the word corresponding or substantially correspond to the keyword, and a subset of words in proximity to the word (e.g., words in a sentence or sentence fragment that are spoken prior to and/or just after the word is spoken in the item of content), are to be presented in connection with the presentation of the content. The highlighter component 620 can highlight or emphasize the word relative to the subset of words to enable the user to readily perceive the word as the word and subset of words are presented (e.g., displayed) via a display screen of the presentation component or other communication device. For instance, the highlighter component 620 can generate a highlighted box of a desired color that can surround the word as it is presented on the display screen, can make the color of the characters of the word different from the color of the characters of the subset of words, can generate the characters of the word larger in size than the size of the characters of the subset of words, and/or can place an indicator icon in proximity to the word to emphasize or draw attention to the word.

The application component 622 can be employed to generate, provide, and/or enable use of one or more applications (e.g., a search application, a content-related application) that can be used by the device (e.g., STB), another type of communication device (e.g., mobile phone, electronic pad or tablet), the presentation component (e.g., television), and/or the remote control component. For example, a user can use a communication device to download an application from the application component 622 to the communication device or can otherwise obtain and/or access the application (directly or indirectly) from the application component 622. The application can operate in conjunction with the search component 600 (including the interface component 610) to facilitate performing searches of content based on textual search queries, obtaining search results in response to a search query, presenting content (e.g., content related to a search result), and/or performing other functions or operations. As another example, the application component 622 can generate, provide, and/or enable use of a content provider application (e.g., Pandora application, YouTube application, Hulu application, Netflix application, . . . ) that can facilitate providing content from a content provider (e.g., a server device of the content provider) to the device for presentation via the presentation component or other communication device.

The search component 600 can comprise a processor component 624 that can work in conjunction with the other components (e.g., communicator component 602, aggregator component 604, analyzer component 606, search manager component 608, interface component 610, voice recognition component 612, transcript generator component 614, locator component 616, indicator generator component 618, highlighter component 620, application component 622, data store 626) to facilitate performing the various functions of the search component 600. The processor component 624 can employ one or more processors, microprocessors, or controllers that can process data, such as information relating to users, user preferences, search queries, keywords, content, searching content, transcripts of items of content, search results, content providers, content sources, the communication network, traffic flows, policies, defined algorithms (e.g., search algorithm(s), voice recognition algorithm(s)), protocols, interfaces, tools, and/or other information, to facilitate operation of the search component 600, as more fully disclosed herein, and control data flow between the search component 600 and other components (e.g., communication devices, presentation component, remote control component, content provider devices, devices of the communication network, data sources, applications) associated with the search component 600.

The search component 600 also can include a data store 626 that can store data structures (e.g., user data, metadata), code structure(s) (e.g., modules, objects, hashes, classes, procedures) or instructions, information relating to users, user preferences, search queries, keywords, content, searching content, transcripts of items of content, search results, content providers, content sources, the communication network, traffic flows, policies, defined algorithms, protocols, interfaces, tools, and/or other information, to facilitate controlling operations associated with the search component 600. In an aspect, the processor component 624 can be functionally coupled (e.g., through a memory bus) to the data store 626 in order to store and retrieve information desired to operate and/or confer functionality, at least in part, to the communicator component 602, aggregator component 604, analyzer component 606, search manager component 608, interface component 610, voice recognition component 612, transcript generator component 614, locator component 616, indicator generator component 618, highlighter component 620, application component 622, data store 526, etc., and/or substantially any other operational aspects of the search component 600.

It is to be appreciated and understood that the device, a data store of or associated with the device, and/or the search component can comprise an authenticator component that can employ authentication protocols to facilitate security of data associated with a memory (e.g., a data store), the device (e.g., STB), and/or an application, in accordance with the disclosed subject matter. For example, the authenticator component can solicit authentication data (e.g., an authentication credential) from an entity (e.g., a user, another device), and, upon the authentication data so solicited, can be employed, individually and/or in conjunction with information acquired and ascertained as a result of biometric modalities employed, to facilitate control access to the memory or the device. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authenticator component can implement one or more machine-implemented techniques to identify an entity by its unique physical and behavioral characteristics and attributes. Biometric modalities that can be employed can include, for example, finger print identification that can scan the corrugated ridges of skin that are non-continuous and form a pattern that can provide distinguishing features to identify an entity, face recognition wherein measurements of key points on an entity's face can provide a unique pattern that can be associated with the entity, and iris recognition that measures from the outer edge towards the pupil the patterns associated with the colored part of the eye—the iris—to detect unique features associated with an entity's iris.

In response to verifying that the received authentication data matches stored authentication data relating to the entity, the authenticator component can grant a set of access rights to the memory, the device, or the application, in accordance with access rights that the entity is permitted to have. In response to not being able to verify that the received authentication data matches stored authentication data relating to the entity, the authenticator component can deny access rights to the memory, the device, or the application, or can grant limited access rights to the entity, wherein the limited access rights can be access rights that are permitted to be granted to non- or un- authorized entities. The authenticator component also can provide an entity with one or more additional opportunities to provide valid authentication data up to a defined maximum number of authentication attempts.

It is also to be understood and appreciated that cryptographic protocols can be employed to facilitate security of data associated with a memory (e.g., data store), content, or the search component in accordance with the disclosed subject matter. For example, a cryptographic component (e.g., cryptographic engine) can be employed and can facilitate encrypting and/or decrypting data (e.g., content, content-related information, search-related information, user-related information) to facilitate securing data being written to, stored in, and/or read from the memory, and/or data beinge communicated to or from the device. The cryptographic component can provide symmetric cryptographic tools and accelerators (e.g., Twofish, Blowfish, AES, TDES, IDEA, CAST5, RC4, etc.) to ensure that the device, the memory, or at least a specified partition in the memory component, or the application, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that the device, the memory (e.g., a specified partition in the memory), or the application, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the device, the memory, or the application, or portions thereof, is confined to those entities authorized to gain access.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 7-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
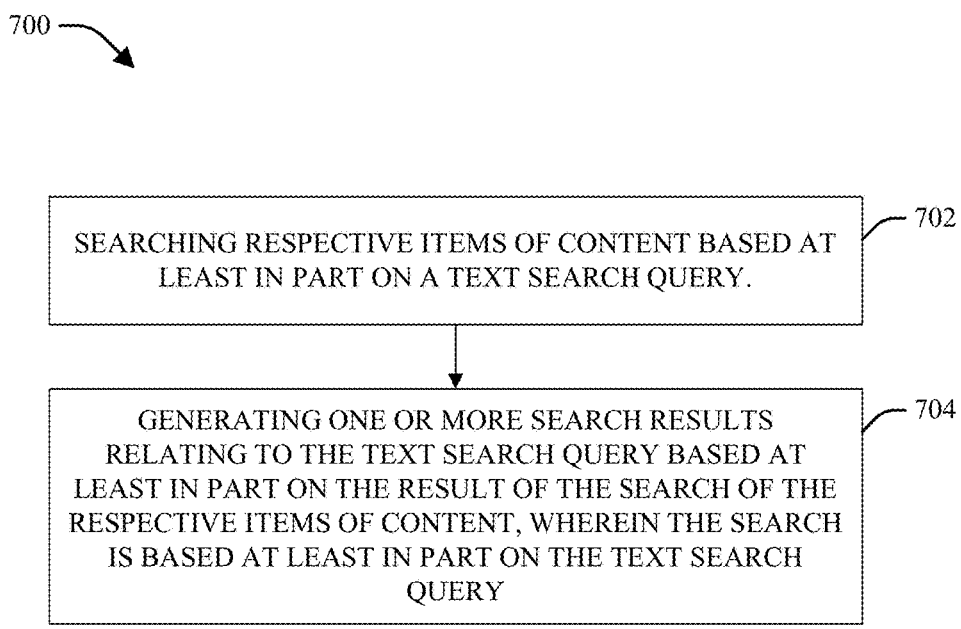
FIG. 7 illustrates a flow diagram of an example method that can search content (e.g., video content comprising audio, audio content) based at least in part on a text search, in accordance with various aspects and embodiments of the disclosed subject matter.

FIG. 7 illustrates a flow chart of an example method 700 that can search content (e.g., video content comprising audio, audio content) based at least in part on a text search, in accordance with various aspects and embodiments of the disclosed subject matter. The method 700 can be employed by, for example, a search component. In some implementations, all or a portion of the method 700 can be performed by a device, such as a device, such as a media device (e.g., STB). In certain implementations, all or a portion of the method 700 can be performed in the cloud (e.g., in a cloud computing environment).

At 702, respective items of content (e.g., video content, comprising audio) or audio content) can be searched based at least in part on a text search query. The search component can search the respective items of content based at least in part on the text search query comprising a keyword. The respective items of content can comprise items of content stored in a data store of the device, items of content stored in a local external data store associated with the device, items of content stored in a data store in the cloud, or items of content that can be accessed from servers associated with content providers, which can be accessed via the Internet and/or an application(s). The text search query, comprising one or more keywords, can be received by the search component from a user via the device, a presentation component associated with the device, a remote control component associated with the device or the presentation component, or a communication device (e.g., mobile phone, electronic pad or tablet, computer, . . . ).

In some implementations, with regard to an item of content, the search component can analyze the content to identify at least audio information (e.g., words spoken) in the content, and can generate a transcript of the words spoken in the content based at least in part on the analysis. With regard to the respective items of content, the search component can search an item of content, based at least in part on the received text search query comprising the one or more keywords, to determine whether a one or more words in the item of content matches or substantially matches the one or more keywords, in accordance with the defined match criteria (e.g., determine whether a word in the item of content satisfies the defined match criterion with regard to the keyword).

At 704, one or more search results relating to the text search query can be generated based at least in part on the result of the search of the respective items of content, wherein the search is based at least in part on the text search query. The search component can generate one or more search results based at least in part on the searching of the respective items of content using the text search query, in accordance with the defined match criteria.

Figure 8:
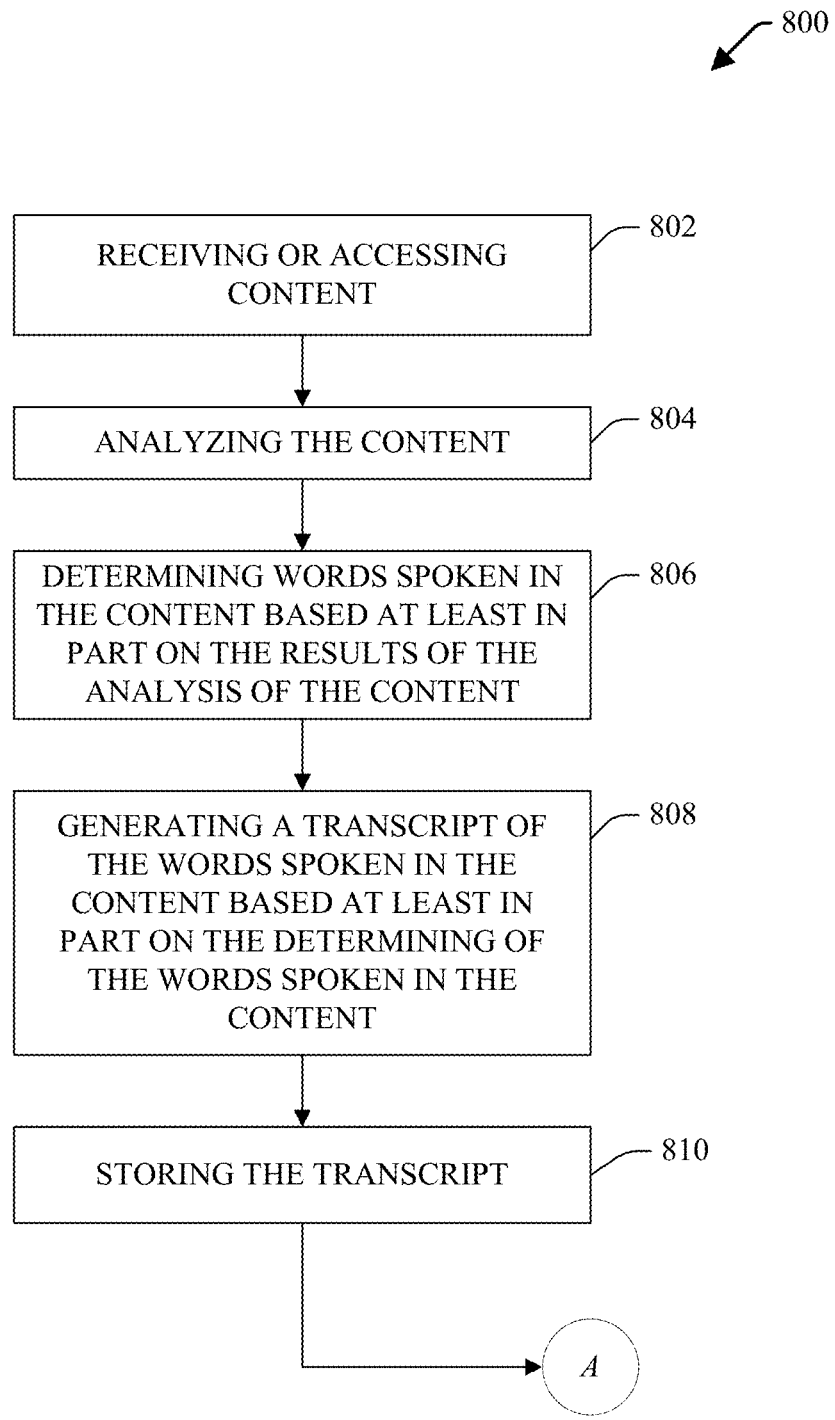
FIG. 8 presents a flow chart of another example method that can generate respective transcripts of respective items of content, wherein the respective transcripts can be searched, based at least in part on a text search, to determine whether a word(s) was spoken in the respective items of content, in accordance with various aspects and embodiments of the disclosed subject matter.

FIG. 8 presents a flow chart of another example method 800 that can generate respective transcripts of respective items of content, wherein the respective transcripts can be searched, based at least in part on a text search, to determine whether a word(s) was spoken in the respective items of content, in accordance with various aspects and embodiments of the disclosed subject matter. The method 800 can be employed by, for example, a search component. In some implementations, all or a portion of the method 800 can be performed by a device, such as a media device (e.g., STB). In certain implementations, all or a portion of the method 800 can be performed in the cloud (e.g., in a cloud computing environment).

At 802, content can be received or accessed. The search component can access and/or receive the content (e.g., video content comprising audio information, audio content), for example, from a data store of the device, another data store, or another data source (e.g., a website of a content provider, via the Internet, or an application(s) associated with a content provider).

At 804, the content can be analyzed. The search component can analyze the content to facilitate identifying words spoken in the content.

At 806, words spoken in the content can be determined based at least in part on the results of the analysis of the content. The search component can determine all or a portion of the the words spoken in the content based at least in part on the results of the analysis of the content. The search component can employ speech and/or voice recognition techniques, functionality, and/or algorithms to facilitate determining all or a portion of the words spoken in the content, and/or identifying different voices of persons and/or the identities of different persons speaking respective words.

At 808, a transcript of the words spoken in the content can be generated based at least in part on the determining of the words spoken in the content. In response to determining the words spoken in the content, the search component can generate the transcript of all or at least a portion of the words spoken in the content.

At 810, the transcript can be stored. The search component can store the transcript, for example, in the data store of the device or another data store (e.g., a local external data store associated with the device, or a data store in the cloud).

At this point, the method can proceed to reference point A. In some implementations, method 900 can proceed from reference point A.

Figure 9:
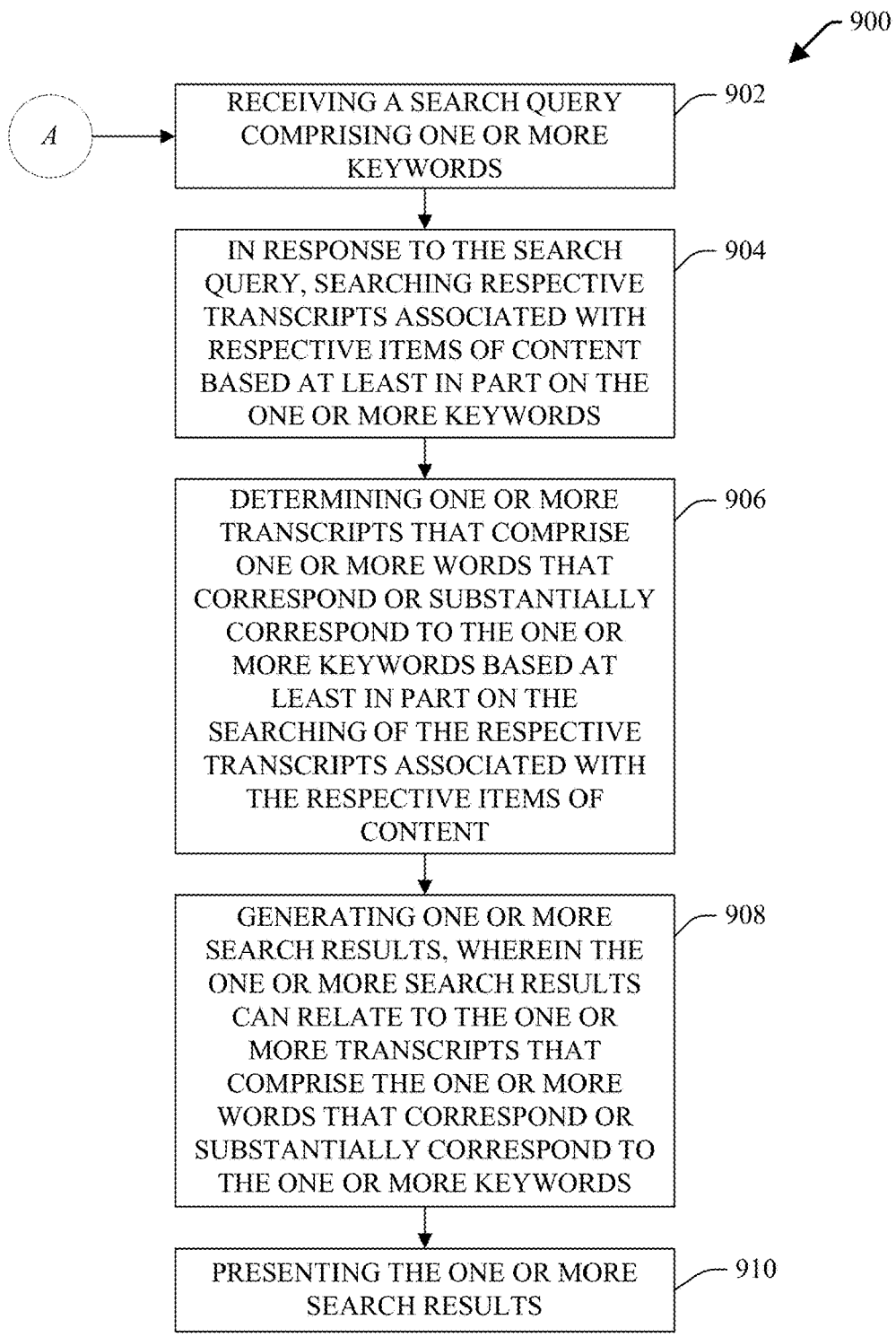
FIG. 9 depicts a flow diagram of an example method that can search content (e.g., video content comprising audio, audio content) based at least in part on a text search, in accordance with various aspects and embodiments of the disclosed subject matter.

FIG. 9 depicts a flow chart of another example method 900 that can search content (e.g., video content comprising audio, audio content) based at least in part on a text search, in accordance with various aspects and embodiments of the disclosed subject matter. The method 900 can be employed by, for example, a search component. In some implementations, all or a portion of the method 900 can be performed by a device, such as a media device (e.g., STB). In certain implementations, all or a portion of the method 900 can be performed in the cloud (e.g., in a cloud computing environment). In some implementations, the method 900 can proceed from reference point A, where the method 800 of FIG. 8 ended.

At 902, a search query comprising one or more keywords can be received. The search component can receive the search query from the user who can enter the search query (e.g., enter one or more textual keywords (e.g., search terms)) via an interface screen that can be provided by the interface component. The interface component can generate and provide (e.g., facilitate presenting or displaying) one or more interface screens that can be employed to enter search queries. The one or more interface screens and/or associated buttons and controls (e.g., of an interface screen or on a keyboard or control panel associated with the interface screen) can be provided on the device itself, the presentation component, the remote control component associated with the device and/or presentation component, and/or a communication device of the user.

At 904, in response to the search query, respective transcripts associated with respective items of content can be searched based at least in part on the one or more keywords. The search component can search the respective words in the respective transcripts associated with the respective items of content using the one or more keywords of the search query to facilitate identifying any items of content that contain one or more words that match or at least substantially match the one or more keywords. In some implementations, all or a portion of the transcripts can be generated by the search component of the device analyzing respective items of content to identify words spoken in the respective items of content, for example, using the method 800. In other implementations, the search component can receive or otherwise obtain (e.g., via a search query of the Internet, intranet, and/or an application(s)) all or a portion of the transcripts, which can be generated by another device(s).

At 906, one or more transcripts that comprise one or more words that correspond or substantially correspond to the one or more keywords can be determined based at least in part on the searching of the respective transcripts associated with the respective items of content. Based at least in part on the search, the search component can determine one or transcripts of the respective transcripts that contain one or more words that correspond or at least substantially correspond to (e.g., match or at least substantially match) the one or more keywords, in accordance with the defined match criteria, which can define whether a word matches or at least substantially matches a keyword.

At 908, one or more search results can be generated, wherein the one or more search results can relate to the one or more transcripts that comprise the one or more words that correspond or substantially correspond to the one or more keywords. The search component can determine and generate the one or more search results, in response to the determining the one or more transcripts that comprise one or more words that correspond or substantially correspond to the one or more keywords.

At 910, the one or more search results can be presented. The search component and interface component can facilitate presenting the one or more search results to the user. For instance, the interface component can generate an interface screen (e.g., a search results interface screen) that can be provided or presented to the user via the device (e.g., a display screen on the device), a display screen of a presentation component associated with the device, or a display screen of a communication device associated with the device (e.g., via the communication network).

The one or more search results can present information relating to the results of the search. Such information can comprise, for example, a summary of an item of content, a portion of the text (e.g., text comprising a word(s) that at least substantially corresponds to a keyword(s)) associated with the content, time information that can indicate time locations in the item of content where the one or more words, which at least substantially correspond to the one or more keywords, are located, and/or other desired information. The user can select a search result(s) of the one or more search results to view the item(s) of content, or a desired portion thereof (e.g., the portion(s) of the item of content where the one or more words appear in the item of content).

Figure 10:
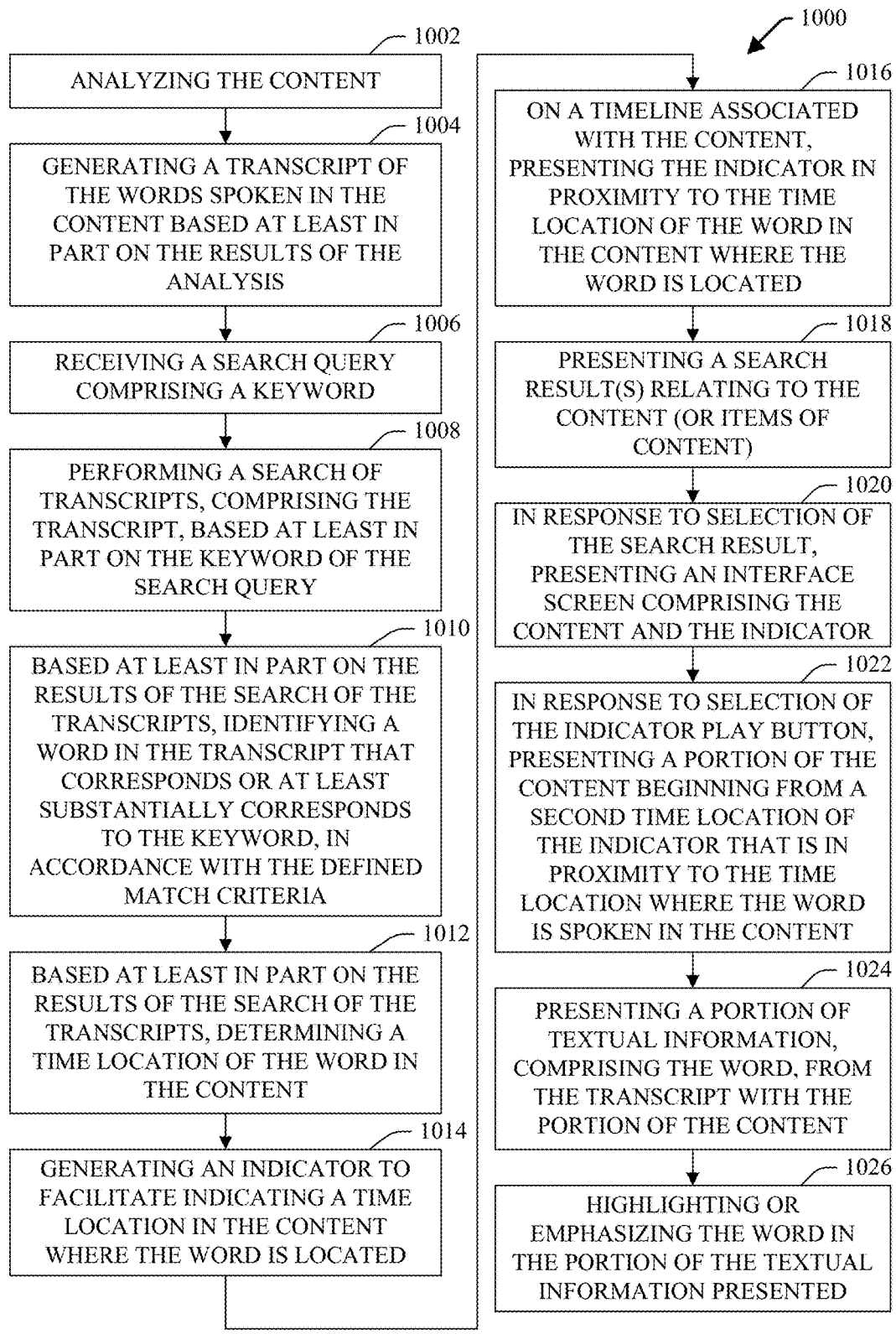
FIG. 10 illustrates a flow chart of an example method that can present an indicator (e.g., time indicator) in connection with a search result relating to a textual search of content (e.g., video content comprising audio, audio content) to facilitate indicating where a word is stated in the content, in accordance with various aspects and embodiments of the disclosed subject matter.

Turning to FIG. 10, illustrated is a flow chart of an example method 1000 that can present an indicator (e.g., time indicator) in connection with a search result relating to a textual search of content (e.g., video content comprising audio, audio content) to facilitate indicating where a word is stated in the content, in accordance with various aspects and embodiments of the disclosed subject matter. The method 1000 can be employed by, for example, a search component. In some implementations, all or a portion of the method 1000 can be performed by a device, such as a media device (e.g., STB). In certain implementations, all or a portion of the method 1000 can be performed in the cloud (e.g., in a cloud computing environment).

At 1002, content can be analyzed. The search component can analyze the content to facilitate identifying words spoken in the content and/or respective time locations of respective words spoken in the content. The search component can employ speech and/or voice recognition techniques, functionality, and/or algorithms to facilitate identifying all or at least a portion of the words spoken in the content, and/or identifying different voices of persons and/or the identities of different persons speaking respective words.

At 1004, a transcript of the words spoken in the content can be generated based at least in part on the results of the analysis. The search component can generate the transcript of the words spoken in the content based at least in part on the analysis results. As part of generating the transcript, the search component can determine respective time locations in the content where respective words are spoken in the content, and can include time information (e.g., time indicators) in the transcript, wherein respective items of time information can be associated with (e.g., linked to, and/or located or placed in proximity to) respective words in the transcript.

At 1006, a search query comprising a keyword can be received. The search component can receive the search query from a user via an interface screen that the user can utilize to enter and send the search query (e.g., enter one or more textual keywords (e.g., search terms)) to the search component of the device. The interface component can generate and provide one or more interface screens (e.g., a search query or search engine interface screen) that can be employed to enter search queries. The one or more interface screens and/or associated buttons and controls (e.g., of an interface screen or on a keyboard or control panel associated with the interface screen(s)) can be provided on the device, the presentation component, the remote control component associated with the device and/or presentation component, and/or a communication device of the user.

At 1008, a search of transcripts, comprising the transcript, can be performed, based at least in part on the keyword of the search query. The search component can search the transcripts to determine whether any words correspond or at least substantially correspond to (e.g., match or at least substantially match) the keyword, in accordance with the defined match criteria.

At 1010, based at least in part on the results of the search of the transcripts, a word in the transcript that corresponds or at least substantially corresponds to the keyword can be identified, in accordance with the defined match criteria. The search component can identify or determine the word (or words) in the transcript (and/or another transcript(s)) that corresponds or at least substantially corresponds to the keyword, in accordance with the defined match criteria.

At 1012, based at least in part on the results of the search of the transcripts, a time location of the word in the content can be determined. The search component can determine the time location of the word in the transcript, based at least in part on the results of the search of the transcripts. For instance, the search component can identify the time information associated with the word in the transcript, wherein the time information can indicate or specify the time location of the word in the content. If a particular transcript did not include time information indicating the time location of the word in the content, the search component can analyze the content to determine the time location of the word in the content.

At 1014, an indicator (e.g., a time location indicator) can be generated to facilitate indicating a time location in the content where the word is located. The search component can generate the indicator, in response to determining the time location of the word in the content.

At 1016, on a timeline associated with the content, the indicator can be presented in proximity to the time location of the word in the content where the word is located. The search component can, on a timeline associated with the content, present (e.g., insert, place, or position) the indicator in proximity to (e.g., within a defined amount of time prior to) the time location of the word in the content.

At 1018, a search result(s) relating to the content can be presented. The search component can generate one or more search results, comprising the search result, relating to the content (or items of content) based at least in part on performing the search on the query. The search result(s) can comprise information (e.g., search result information) that can comprise, for example, a summary of the content, a portion of the text (e.g., text comprising the word) associated with the content, time information that can indicate the time location(s) in the content where the word is located, and/or other desired information. The search component and interface component can facilitate presenting the one or more search results to the user via an interface screen (e.g., a search result interface screen), which can be provided (e.g., presented) via the device, the presentation component, and/or a communication device.

At 1020, in response to selection of the search result, an interface screen comprising the content and the indicator can be presented. In response to selection of the search result, the search component and interface component can facilitate presenting an interface screen that comprise the content, the timeline associated with the content, and the indicator, which can be presented along or in proximity to the timeline in a second time location that can be in proximity to the time location where the word is spoken in the content.

At 1022, in response to selection of the indicator or selection of a play button, a portion of the content can be presented beginning from a second time location of the indicator that is in proximity to the time location where the word is spoken in the content. In response to the user selecting the indicator or a play button on the interface screen, the search component can facilitate presenting the portion of the content beginning from the second time location of the indicator that is in proximity to the time location where the word is spoken in the content. The portion of the content can be presented, for example, on the display screen of the presentation component or a display screen of the communication device.

At 1024, a portion of textual information from the transcript can be presented with the portion of the content, wherein the portion of the textual information can correspond to words, including the word, being spoken in the portion of the content. The search component can generate the portion of the textual information. The search component and interface component can facilitate presenting the portion of the textual information with the portion of the content via the display screen of the presentation component or display screen of the communication device.

At 1026, the word can be highlighted or emphasized in the portion of the textual information presented. In some implementations, the search component and interface component can facilitate highlighting or emphasizing the word, relative to the other words, presented on the interface screen presented on the display screen of the presentation component or display screen of the communication device, based at least in part on the word being determined to correspond or at least substantially correspond to the keyword in the search query. The highlighting or emphasizing of the word can facilitate notifying the user that the desired term (e.g., keyword) is being spoken at or near the time it is being spoken in the content.

Figure 11:
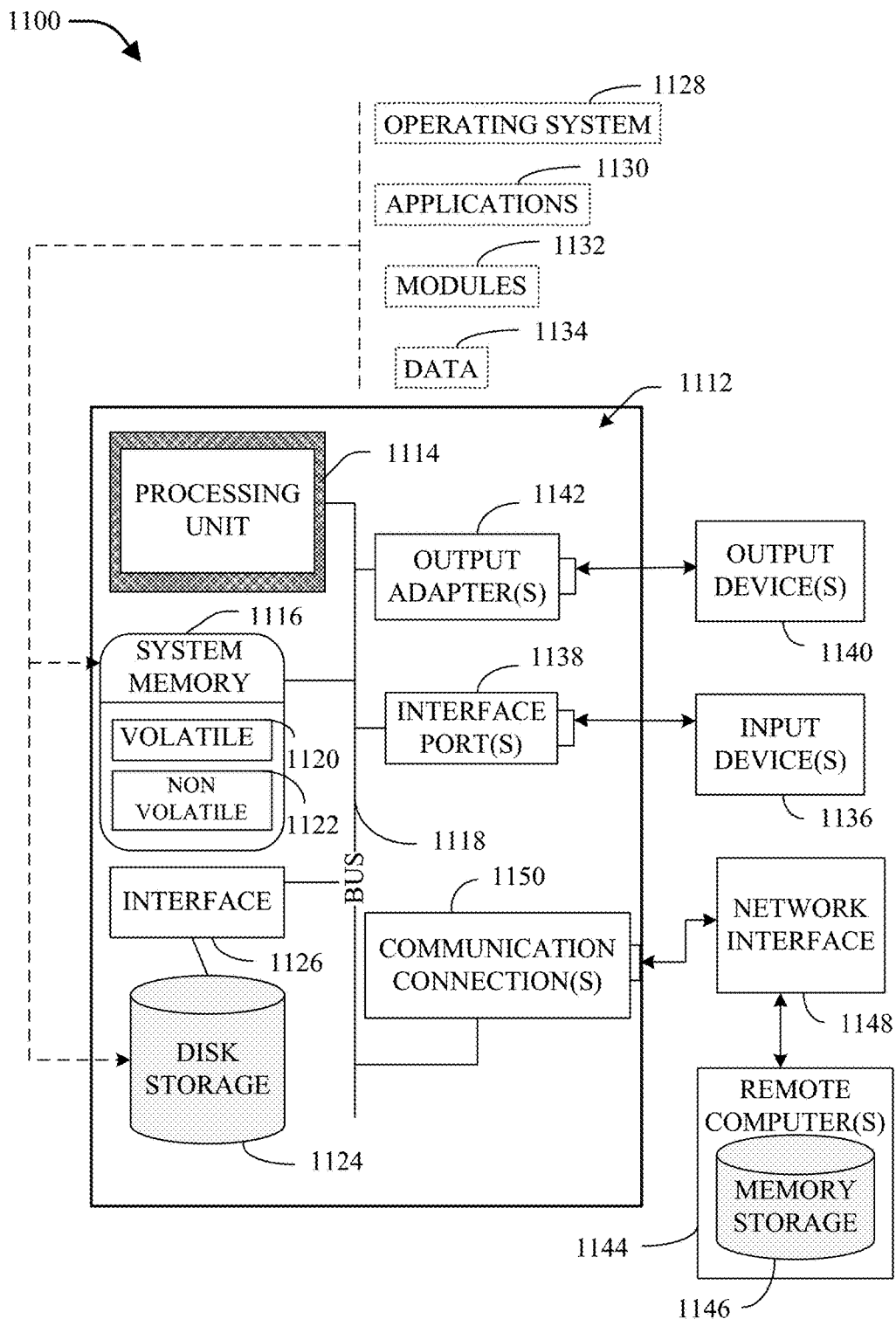
FIG. 11 is a schematic block diagram illustrating a suitable operating environment.
Figure 12:
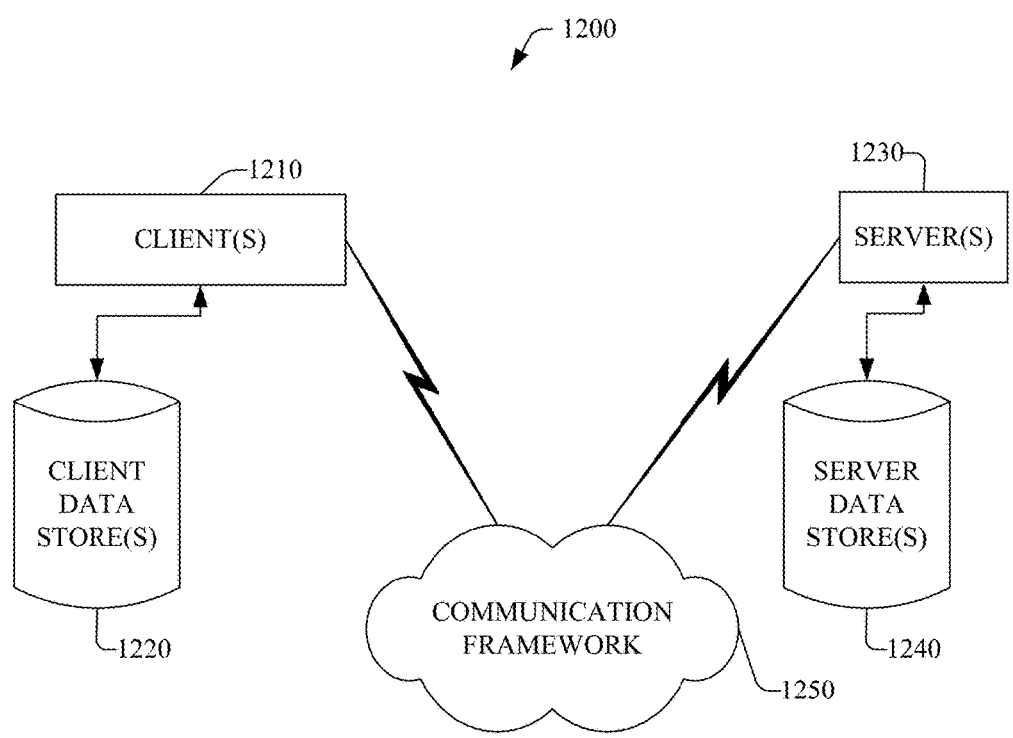
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablet or pad, PDA, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 11, a suitable environment 1100 for implementing various aspects of this disclosure includes a computer 1112. The computer 1112 includes a processing unit 1114, a system memory 1116, and a system bus 1118. It is to be appreciated that the computer 1112 can be used in connection with implementing one or more of the systems, components, or methods shown and described in connection with FIGS. 1-10, or otherwise described herein. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored, e.g., in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 (e.g., computing system) with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects, features, and/or advantages of the disclosed subject matter can be exploited in substantially any wireless telecommunication or radio technology, e.g., wi-fi; bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, presentation component, communication device, search component, interface component, remote control component, application component, communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
based on a keyword, searching, by a system comprising a processor, respective audio items of audio information in respective media items of media content to identify information of interest in a media item of the respective media items;
generating, by the system, a search result associated with the media item and relating to the information of interest based on the searching of the respective audio items in the respective media items;
estimating, by the system, a time location of the information of interest within an audio item in the media item based on a determination of a location of a word within a transcript of the media item relative to other words within the transcript, wherein the word corresponds to the keyword, wherein the transcript is received from a device associated with an external transcript source, wherein the transcript does not comprise time information that indicates the time location, and wherein the audio item is part of the respective audio items; and
determining, by the system, the time location of the information of interest within the audio item, based on a result of analyzing a first portion of the audio item that is in proximity to the estimation of the time location and is less than an entire portion of the audio item, to facilitate presenting a time indicator that indicates the time location in the media item where the information of interest is located relative to an overall time of the media item, wherein the time indicator is selectable to initiate a presentation of a second portion of the media item comprising the information of interest, and wherein a start time location of the second portion of the media item is within a defined proximity of the time location in the media item where the information of interest is determined to be located.

2. The method of claim 1, wherein the media item of the respective media items comprises a member of a group comprising video content and audio content.

3. The method of claim 1, further comprising:
receiving, by the system, a search query via an interface, wherein the search query comprises the keyword.

4. The method of claim 1, wherein the searching the respective audio items comprises searching respective transcripts, comprising respective textual items of textual information that correspond to respective words identified in the respective audio items, wherein the searching of the respective transcripts is performed to identify the information of interest that is associated with a word of the respective words in the respective transcripts that satisfies a defined match criterion with respect to the keyword.

5. The method of claim 4, further comprising:
analyzing, by the system, the respective audio items in the respective media items;
based on the analyzing, determining, by the system, the respective words that are stated in the respective audio items; and
based on the determining of the respective words, generating, by the system, the transcripts comprising the respective textual items that correspond to the respective words stated in the respective audio items.

6. The method of claim 4, further comprising:
obtaining, by the system, copies of the transcripts comprising the respective textual items that correspond to the respective words identified in the respective audio items, wherein the transcripts comprise the transcript.

7. The method of claim 4, further comprising:
obtaining, by the system, the transcripts comprising the respective textual items related to closed-captioning of the respective media items.

8. The method of claim 1, wherein the search result comprises textual information that comprises the word that corresponds to the keyword and the time indicator that indicates the time location in the media item where the information of interest is located relative to the overall time of the media item, and wherein the method further comprises:
presenting, by the system, the search result, comprising the time indicator, in connection with presentation of the media item.

9. The method of claim 8, further comprising:
receiving, by the system, input information indicating selection of the time indicator of the search result; and
in response to the input information, presenting, by the system, the second portion of the media item that has the start time location that is within the defined proximity of the time location in the media item where the information of interest is located based on the selection of the time indicator.

10. The method of claim 9, further comprising:
during the presenting of the second portion of the media item, presenting, by the system, the textual information relating to the information of interest in proximity to the time location in the media item where the information of interest is located; and
in connection with the presenting of the textual information, highlighting, by the system, the textual information relating to the information of interest during the presenting of the second portion of the media item.

11. The method of claim 1, further comprising:
receiving, by the system, the media item from a media source device, wherein the media source device is associated with a member of a group comprising an application, a cable television service, a satellite television service, a media streaming service, a media-on-demand service, a pay-per-view media service, a media content provider associated with an Internet, a media content provider associated with an intranet, a terrestrial television service, and a terrestrial radio service.

12. A system, comprising:
a processor; and
a memory that stores executable instructions that, when executed by the processor, facilitate performance of operations, comprising:
searching respective items of audio data in respective media items to identify data of interest in a media item of the respective media items, based on a keyword;
generating a search result relating to the data of interest based on the searching of the respective items of the audio data in the respective media items, wherein the media item comprises a member of a group comprising video content and audio content;
estimating a time location of the data of interest within an item of audio data in the media item based on a location of a word within a transcript of the media item in relation to respective locations of other words within the transcript, wherein the word corresponds to the keyword, wherein the transcript is received from a device associated with an independent transcript source, wherein the transcript does not comprise time data that indicates the time location, and wherein the item of audio data is one of the respective items of audio data; and
determining the time location of the data of interest within the item of audio data, based on a result of analyzing a first portion of the item of audio data that is in proximity to the estimation of the time location and is less than an entire portion of the item of audio data, to facilitate presenting a time indicator that indicates the time location in the media item where the data of interest is located relative to a total time of the media item, wherein the time indicator is selectable to initiate a presentation of a second portion of the media item beginning at a defined period of time prior to the time location in the media item where the data of interest is determined to be located.

13. The system of claim 12, wherein the operations further comprise:
receiving a search request via an interface component, and wherein the search request comprises the keyword.

14. The system of claim 12, wherein the searching the respective items of the audio data comprises searching respective transcripts, comprising respective items of textual information that correspond to respective words identified in the respective items of the audio data, wherein the searching of the respective transcripts is performed to identify the data of interest that is associated with the word of the respective words in the respective transcripts that sufficiently corresponds to the keyword to satisfy a defined match criterion, and wherein the defined match criterion is used to define a keyword match.

15. The system of claim 14, wherein the operations further comprise:
analyzing the respective items of the audio data in the respective media items;
determining the respective words that are stated in the respective items of the audio data based on a result of the analyzing; and
generating the transcripts comprising the respective items of textual data that correspond to the respective words stated in the respective items of the audio data, based on the determining of the respective words.

16. The system of claim 15, wherein the generating of the transcripts, the searching of the respective items of the audio data in the respective media items, and the generating of the search result are executed within a set-top box device.

17. The system of claim 12, wherein the search result comprises textual data that comprises the word that corresponds to the keyword and the time indicator that indicates the time location in the media item where the data of interest is located relative to the total time of the media item, and wherein the operations further comprise:
displaying the search result in connection with presenting the media item.

18. The system of claim 17, wherein the operations further comprise:
receiving selection information indicating selection of the search result; and
in response to the selection information, initiating the presentation of the second portion of the media item beginning at the defined period of time prior to the time location in the media item where the data of interest is located.

19. A non-transitory machine-readable storage medium, comprising executable instructions that, when executed by a processor, facilitate performance of operations, comprising:
based on a keyword, searching respective items of audio information in respective items of video content comprising respective items of audio content to identify information of interest in an item of video content of the respective items of video content;
generating a search result associated with the item of video content and relating to the information of interest based on the searching of the respective items of audio information in the respective items of video content;
estimating a time location of the information of interest within an item of audio information in the item of video content based on a determination of a location of a word within a transcript of the item of video content relative to other words within the transcript, wherein the word corresponds to the keyword, wherein the transcript is received from a device associated with an external transcript source, wherein the transcript does not comprise time data that indicates the time location, and wherein the item of audio information is part of the respective items of audio information; and
determining the time location of the information of interest within the item of audio information, based on a result of analyzing a first portion of the item of audio information that is in within a defined amount of time of the estimation of the time location and is less than an entire portion of the item of audio information, to facilitate presenting a time indicator that indicates the time location in the item of video content where the information of interest is located relative to an overall time of the item of video content, wherein the time indicator is selectable to initiate a presentation of a second portion of the item of video content that begins at a start time location that is within a defined proximity of the time location in the item of video content where the information of interest is determined to be located.

20. The non-transitory machine-readable storage medium of claim 19, wherein the searching the respective items of audio information in the respective items of video content comprises searching respective transcripts, comprising respective items of textual information that correspond to respective words identified in the respective items of audio information, wherein the searching of the respective transcripts facilitates identifying the information of interest that is associated with a word of the respective words in the respective transcripts that satisfies a defined match criterion, and wherein the defined match criterion relates to keyword matches.

* * * * *